(12) United States Patent
Shono

(10) Patent No.: US 8,894,136 B2
(45) Date of Patent: Nov. 25, 2014

(54) STRUCTURE FOR SIDE PORTION OF VEHICLE BODY

(75) Inventor: Hidekazu Shono, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/991,806

(22) PCT Filed: Nov. 4, 2011

(86) PCT No.: PCT/JP2011/075418
§ 371 (c)(1),
(2), (4) Date: Jun. 5, 2013

(87) PCT Pub. No.: WO2012/077437
PCT Pub. Date: Jun. 14, 2012

(65) Prior Publication Data
US 2013/0257101 A1    Oct. 3, 2013

(30) Foreign Application Priority Data
Dec. 7, 2010   (JP) .................................. 2010-273006

(51) Int. Cl.
*B62D 25/06*   (2006.01)

(52) U.S. Cl.
CPC .................................... *B62D 25/06* (2013.01)
USPC ...................... 296/210; 296/203.03; 296/29

(58) Field of Classification Search
USPC ............. 296/191, 193.06, 203.02–4, 205, 29, 296/210
See application file for complete search history.

(56) References Cited

U.S. PATENT DOCUMENTS

| 4,634,173 A * | 1/1987 | Aonuma et al. | 296/203.04 |
| 4,883,310 A * | 11/1989 | Miyazaki et al. | 296/210 |
| 5,318,338 A * | 6/1994 | Ikeda | 296/210 |
| 5,795,014 A * | 8/1998 | Balgaard | 296/210 |
| 6,578,909 B1 * | 6/2003 | Reed et al. | 296/210 |
| 6,962,389 B2 * | 11/2005 | Katsuma | 296/187.12 |

(Continued)

FOREIGN PATENT DOCUMENTS

| JP | 08-216925 | 8/1996 |
| JP | 2000142469 A * | 5/2000 |

(Continued)

OTHER PUBLICATIONS

PCT/JP2011/075418—Written Opinion Translation.*
WIPO Patentscope translation of WO 2013005567 A1.*

*Primary Examiner* — H Gutman
(74) *Attorney, Agent, or Firm* — Rankin, Hill & Clark LLP

(57) ABSTRACT

A structure for a side portion of a vehicle body that is configured such that the ends of an arch member are mounted to rail members extending in the front-rear direction of the vehicle body and such that a roof panel is supported by the arch member. The structure includes the rail members; the arch member, which extends in the width direction of the vehicle and the ends of which are mounted to the rail members; and the roof panel supported by the arch member. In each of the rail members, an outer extension section is integrally provided to a rail outer section and an inner extension section is integrally provided to a rail inner section. The arch member is provided with an arch upper member that can be installed on the outer extension section and an arch lower member that can be installed on the inner extension section.

13 Claims, 17 Drawing Sheets

(56) References Cited

U.S. PATENT DOCUMENTS

| | | | |
|---|---|---|---|
| 7,290,831 B2 * | 11/2007 | Poss et al. | 296/203.03 |
| 7,407,222 B2 * | 8/2008 | Anderson et al. | 296/193.06 |
| 7,954,886 B2 * | 6/2011 | Kinoshita et al. | 296/193.06 |
| 8,366,184 B2 * | 2/2013 | Ogawa | 296/193.06 |

FOREIGN PATENT DOCUMENTS

| | | |
|---|---|---|
| JP | 2003-118634 | 4/2003 |
| JP | 2008-222013 | 9/2008 |
| JP | 2009-040098 | 2/2009 |
| WO | WO 2004026666 A1 * | 4/2004 |

* cited by examiner

US 8,894,136 B2

STRUCTURE FOR SIDE PORTION OF VEHICLE BODY

TECHNICAL FIELD

The present invention relates to a vehicular side structure including a roof side rail (rail assembly) extending in a front-and-rear direction of a vehicle body and defining an upper portion of the structure, a roof rail (arch assembly) having an end located on the rail assembly, and a roof panel supported by the arch assembly.

BACKGROUND ART

A vehicular side structure of type above is well known, as disclosed in JP-A-2003-118634. The side structure disclosed in JP-A-2003-118634 includes a rail assembly including an inner member (an inner panel) defining an inner wall of the rail assembly. The rail assembly also includes an outer member (a pillar reinforcement member) overlying an exterior surface of a portion of the inner member to provide the rail assembly with a closed cross-section. The side structure also includes an arch assembly extending laterally of a vehicle and connected to the rail assembly. A roof panel is disposed above the arch assembly to cover the arch assembly.

The arch assembly includes upper and lower members which define a closed cross-section. The arch assembly of closed cross-section is spot welded to the rail assembly of closed cross-section to rigidify the vehicular side structure.

As for the side structure disclosed in JP-A-2003-118634, since the outer member of the rail assembly overlies the portion of the inner member of the rail assembly, a boundary between the portion of the inner member and the remaining portion of the inner member defines a boundary between the outer member and the inner member. Thus, to provide the roof panel atop the inner and outer members of the rail assembly, a flange of the roof panel is welded to both of the inner and outer members astride the boundary between the inner and outer members.

However, due to molding or fabrication tolerances of the inner and outer members, it is difficult to accurately form the boundary between the inner and outer members in assembling the inner and outer members together. It is thus difficult to accurately position the roof panel relative to the inner and outer members during a process of welding the flange of the roof panel to both of the inner and outer members astride the boundary therebetween.

As for the side structure disclosed in JP-A-2003-118634, further, the arch assembly of closed cross-section, the rail assembly of closed cross-section and the roof panel are spot welded to one another with the roof panel, the arch assembly and the rail assembly overlapping. This spot welding may be done with four members, that is, the inner member, the outer member, the upper member and the roof panel overlapping or with four members, that is, the inner member, lower member, the upper member and the roof panel overlapping. In this regard, typically, it is desirable to limit the number of sheet members to three when spot welding the sheet members to one another.

PRIOR ART LITERATURE

Patent Literature

Patent Literature 1: JP-A-2003-118634

SUMMARY OF INVENTION

Technical Problem

An object of the present invention is to provide a vehicular side structure having an increased rigidity and designed to achieve accurate positioning of a roof panel as well as to ensure sufficient strength of coupling among a rail assembly, an arch assembly and the roof panel.

Solution to Problem

According to one aspect of the present invention, there is provided a side structure of a vehicle body, the side structure comprising: a rail assembly extending in a front-and-rear direction of the vehicle body and defining an upper part of the side structure of the vehicle body; an arch assembly extending laterally of the vehicle body and having an end located on the rail assembly; a roof panel supported by the arch assembly; the rail assembly including: an outer portion extending in the front-and-rear direction of the vehicle body and located laterally outwardly of the vehicle body; an inner portion disposed closer to a lateral center of the vehicle body than the outer portion, the inner portion cooperating with the outer portion to define a closed cross-sectional structure extending in the front-and-rear direction of the vehicle body; an outer extension portion formed integrally with the outer portion and extending toward the lateral center of the vehicle body; and an inner extension portion formed integrally with the inner portion and extending toward the lateral center of the vehicle body, the inner extension portion having a lateral inner end located closer to the lateral center of vehicle body than a lateral inner end of the outer extension portion, the inner extension portion cooperating with the outer extension portion to define a closed cross-sectional structure; the arch assembly including: an upper member having a lateral outer end carried on the outer extension portion; and a lower member disposed below the upper member and having a lateral outer end carried on the inner extension portion, the lower member cooperating with the upper member to define a closed cross-sectional structure extending laterally of the vehicle body.

Preferably, the roof panel includes a panel body and a roof flange protruding forwardly of the vehicle body from the panel body, the upper member includes an upper body and an upper flange protruding from the upper body of the upper member in overlapping relationship to the roof flange, the upper flange including an upper projection protruding forwardly of the vehicle body more than the roof flange, the lower member includes a lower body and a lower flange protruding from the lower body of the lower member in overlapping relationship to the upper flange, the outer extension portion of the rail assembly includes an extension body and an outer flange protruding from the extension body of the outer extension portion in overlapping relationship to the upper flange, the outer flange having a lateral inner end including an outer projection, the inner extension portion of the rail assembly includes an extension body and an inner flange protruding from the extension body of the inner extension portion in overlapping relationship to the lower flange, the inner flange having an inner projection overlapping the outer projection, and the upper flange, the outer flange and the inner flange define a first spot welding region in which the upper projection, the outer projection and the inner projection are spot welded to one another.

Preferably, the roof flange has a portion corresponding to the outer projection, the upper projection and the inner projection, the portion of the roof flange having a roof recess contoured to avoid the outer projection, the upper projection and the inner projection.

Preferably, a roof side spot welding region in which the roof flange, the upper flange, and the lower flange are spot welded to one another is located closer to the lateral center of the vehicle body than the first spot welding region, the lower flange has a lower flange recess located closer to the lateral center of the vehicle body than the roof side spot welding region, the inner flange of the inner extension portion includes a lateral inner end terminating in the lower flange recess, and a second spot welding region in which the roof flange, the upper flange and the inner flange are spot welded to one another is located in the lower flange recess.

Preferably, a third spot welding region in which the roof flange, the upper flange and the inner flange are spot welded to one another is located laterally outwardly of the lower member and located closer to the lateral center of the vehicle body than the outer extension portion, and a fourth spot welding region in which the roof flange, the outer flange, and the inner flange are spot welded to one another is located laterally outwardly of the upper member.

Preferably, the rail assembly further includes: a reinforcing rail patch disposed between the outer portion and the inner portion; and a patch extension portion formed integrally with the reinforcing rail patch and extending within the closed cross-sectional structure defined by the outer extension portion and the inner extension portion.

Advantageous Effects of Invention

The outer extension portion is formed integrally with the outer portion, and the inner extension portion is formed integrally with the inner portion. The outer extension portion cooperates with the inner extension portion to define the closed cross-sectional structure. The arch assembly has the closed cross-sectional structure defined by the upper and lower members. The upper member is carried on the outer extension portion, and the lower member is carried on the inner extension portion. This means that the arch assembly having the closed cross-sectional structure is provided to the outer and inner extension portions having the closed cross-sectional structure, thereby rigidifying the side structure of the vehicle body.

The rail assembly and the arch assembly are arranged substantially perpendicularly to each other. If the rail assembly and the arch assembly were connected to each other at a junction where the rail assembly meets a line passing through the arch member in a direction perpendicular to the rail member, a stress would be concentrated on the junction in which case it would be difficult to keep the junction rigid.

In this regard, the outer extension portion is formed integrally with the outer portion, and the inner extension portion is formed integrally with the inner portion. The upper member is provided on the outer extension portion, and the lower member is provided on the inner extension portion. This means that the rail assembly is connected to the arch assembly at a connection located away from the junction. As a result, the junction can be kept rigid. This is advantageous because, for example, a load from a front direction of the vehicle body can be transmitted through the rail assembly and the junction to the arch assembly in a preferred manner.

The roof panel is disposed above the arch assembly to cover the arch assembly. In placing the roof panel onto the arch assembly, a flange of the roof panel is welded to the outer portion of the rail assembly. The outer portion extends along the inner portion by substantially the same distance as the inner portion such that the outer portion extends along the entire length of the flange of the roof panel.

Since the outer portion extends alongside the entirety of the flange of the roof panel, the flange of the roof panel can be disposed on the outer portion without spanning a boundary between the outer portion and the inner portion. Thus, the flange of the roof panel can be accurately welded to a desired location of the outer portion. As a result, the roof panel can be accurately positioned in place.

The upper flange includes the upper projection protruding forwardly of the vehicle body more than the roof flange. The outer flange includes the outer projection overlapping the upper projection. The inner flange includes the inner projection overlapping the outer projection. In other words, three projections, that is, the upper projection, the outer projection and the inner projection protrude forwardly of the vehicle body more than the roof flange. These three projections are spot welded to one another to define the first spot welding region.

In assembling the side structure of the vehicle body, the roof panel and the arch assembly may be assembled together into a roof unit. Meanwhile, the outer and inner portions may be assembled together into the rail assembly. Subsequently, the roof unit and the rail assembly may be assembled together. In this case, the three projections not including the roof flange can protrude forwardly of the vehicle body more than the roof flange and then are spot welded together to define the first spot welding region.

The number of the projections spot welded together in the first spot welding region is three, that is, a strong coupling among the upper projection, the outer projection and the inner projection can be achieved by the spot welding. The strong coupling of the upper member (i.e., the arch assembly) to the outer extension portion and the inner extension ensures sufficient rigidity ("coupling strength") of the side structure of the vehicle body.

The roof flange has the portion corresponding to the outer projection, the upper projection and the inner projection, and the portion of the roof flange has the roof recess contoured to avoid the outer projection, the upper projection and the inner projection. Thus, the outer projection, the upper projection and the inner projection protrude a reduced distance. The reduced distance by which these projections protrude toward a windshield improves aesthetic design of the side structure.

Since the outer projection, the upper projection and the inner projection protrude forwardly of the vehicle body more than the front roof flange, a depth of the roof recess can be small to thereby prevent concentration of stress on the roof recess, i.e., to prevent deformation beginning at the roof recess.

The roof side spot welding region in which the roof flange, the upper flange and the lower flange are spot welded to one another is located closer to the lateral center of the vehicle body than the first spot welding region. As the roof panel and the arch assembly are assembled together into the roof unit during assemblage of the side structure of the vehicle body, three flanges, that is, the roof flange, the upper flange and the lower flange are spot welded to one another to define the roof side spot welding region. This ensures sufficient coupling strength of the roof unit.

The lower flange has the lower flange recess. The lower flange recess is located closer to the lateral center of the vehicle body than the rood side spot welding region. The lateral inner end of the inner flange terminates in the lower flange recess. The three flanges, that is, the roof flange, the upper flange and the inner flange are spot welded to one another in the second spot welding region located near the roof side spot welding region and in the lower flange recess. The inner extension portion is thus kept horizontally continuous relative to the lower member, thereby providing a connection between the rail assembly and the arch assembly with a closed cross-section. By virtue of the closed cross-section of the connection, sufficient rigidity of the connection is ensured.

The third spot welding region in which the three flanges, that is, the roof flange, the upper flange and the inner flange are spot welded to one another is located laterally outwardly of the lower member and located closer to the lateral center of the vehicle body than the outer extension portion. The third spot welding region is located closer to the lateral center of the vehicle body than the first spot welding region. The fourth spot welding region in which the three flanges, that is, the roof flange, the outer flange and the inner flange are spot welded to one another is located laterally outwardly of the upper member. Since the fourth spot welding region is laterally outwardly of the vehicle body than the first spot welding region, the third and fourth spot welding regions are located on both sides of the first spot welding region.

No portion of the roof flange is spot welded in the first spot welding region. Since the third and fourth spot welding regions are located on the both sides of the first spot welding region, the roof flange is fixed on the both sides of the first spot welding region to thereby provide sufficient coupling strength of the roof flange.

The second and third spot welding regions are located on both sides of the roof side spot welding region. The roof flange, the upper flange and the lower flange are spot welded to one another in the roof side spot welding region. In the second and third spot welding regions, the roof flange, the upper flange and the inner flange are spot welded to one another. Thus, in a region from the second spot welding region through the roof side spot welding region to the third spot welding region, the lower flange can be firmly coupled to the inner flange via the roof flange and the upper flange.

In the first spot welding region, the upper projection (the upper flange) and the outer projection (the outer flange) are spot welded to each other, and hence the arch assembly is coupled to the rail assembly in a preferred manner. The roof side spot welding region and the second and third spot welding regions are located at given intervals and closer to the lateral center of the vehicle body than the first spot welding region.

Since the spot welding regions are located away from the first spot welding region toward the lateral center of the vehicle body, a stress applied to the connection between the rail assembly and the arch assembly can be dispersed in a preferred manner. Thus, sufficient rigidity of the connection between the rail assembly and the arch assembly is ensured.

The reinforcing rail patch is disposed between the outer portion and the inner portion. The patch extension portion is formed integrally with the reinforcing rail patch and extends within the closed cross-sectional structure defined by the outer extension portion and the inner extension portion. Since the rail patch and the patch extension portion increase rigidity of the rail assembly, it is ensured that the side structure of the vehicle body is further rigid.

DESCRIPTION OF EMBODIMENTS

A certain preferred embodiment of the present invention is described below with reference to the accompanying drawings. Throughout the drawings, arrows "Fr", "Rr", "L" and "R" denote a front direction, a rear direction, a left direction, and a right direction, respectively.

Embodiment

Figure 1:
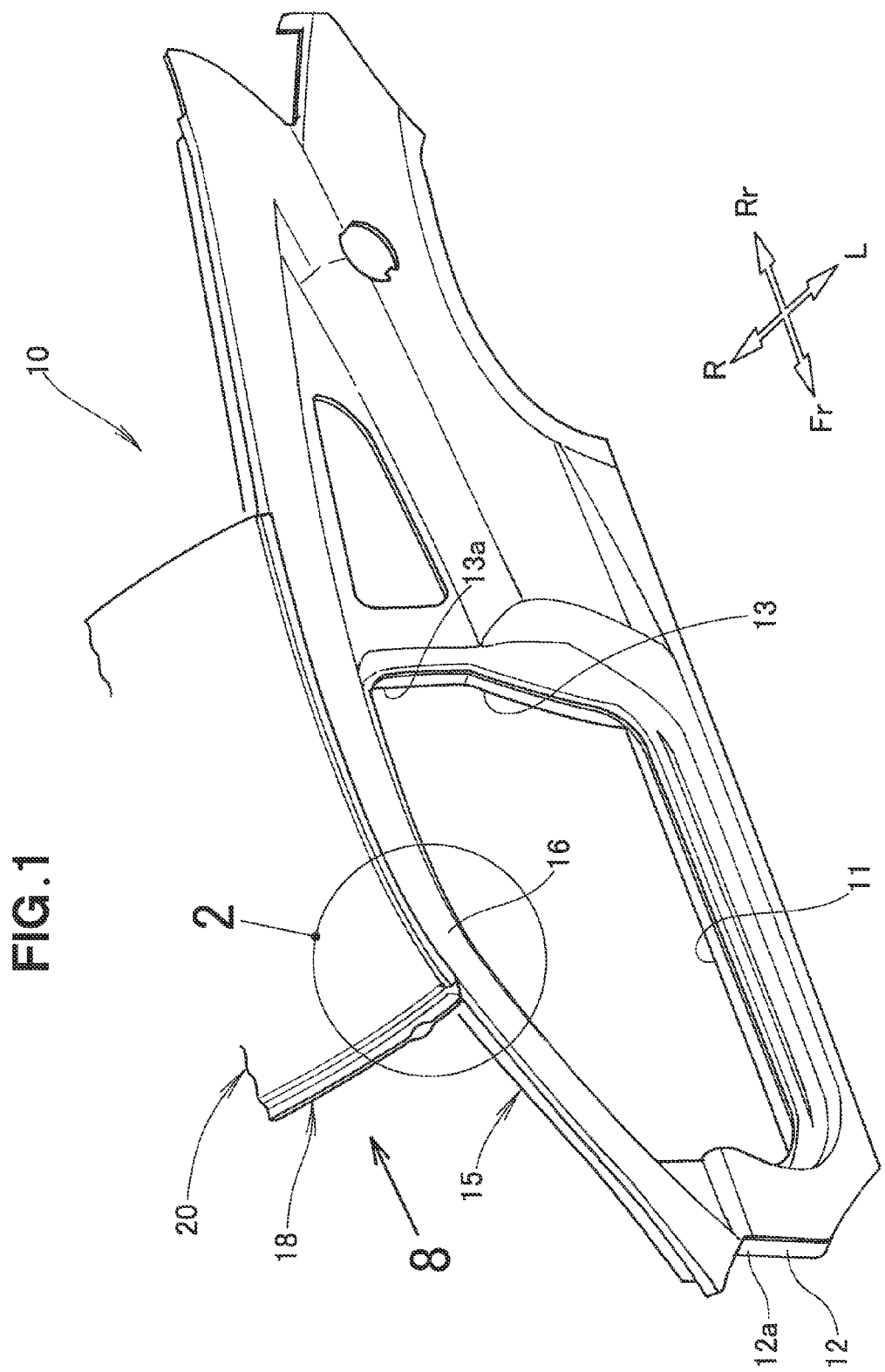
FIG. 1 is a perspective view of a vehicular side structure according to the present invention.

As shown in FIG. 1, a side structure 10 of a vehicle body includes a side sill 11 extending in a front-and-rear direction of the vehicle body and defining a lower part of the side structure 10. The side structure 10 also includes a front pillar 12 extending upwardly from a front end of the side sill 11, and a center pillar 13 extending upwardly from a longitudinally intermediate portion of the side sill 11. The side structure 10 further includes a rail assembly 15 supported by respective upper ends 12a, 13a of the front pillar 12 and the center pillar 13 and defining an upper part of the side structure 10. The side structure 10 further includes a side panel 16 covering outsides of the rail assembly 15 and the center pillar 13. The side structure 10 further includes an arch assembly 18 extending laterally of the vehicle body and having an end located on the rail assembly 15. The side structure 10 further includes a roof panel 20 supported by the arch assembly 18.

Figure 2:
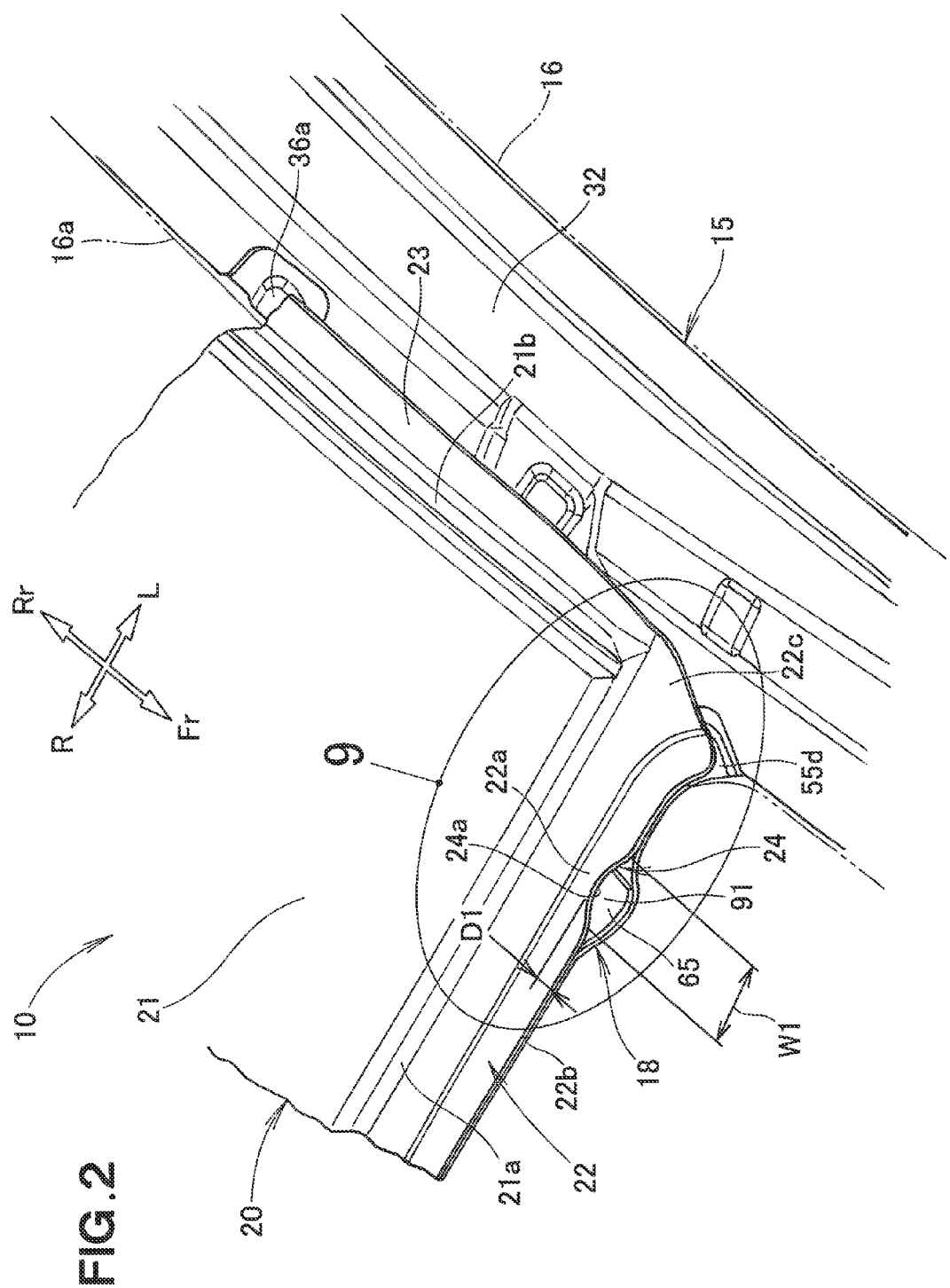
FIG. 2 is an enlarged view of a region 2 of FIG. 1.
Figure 3:
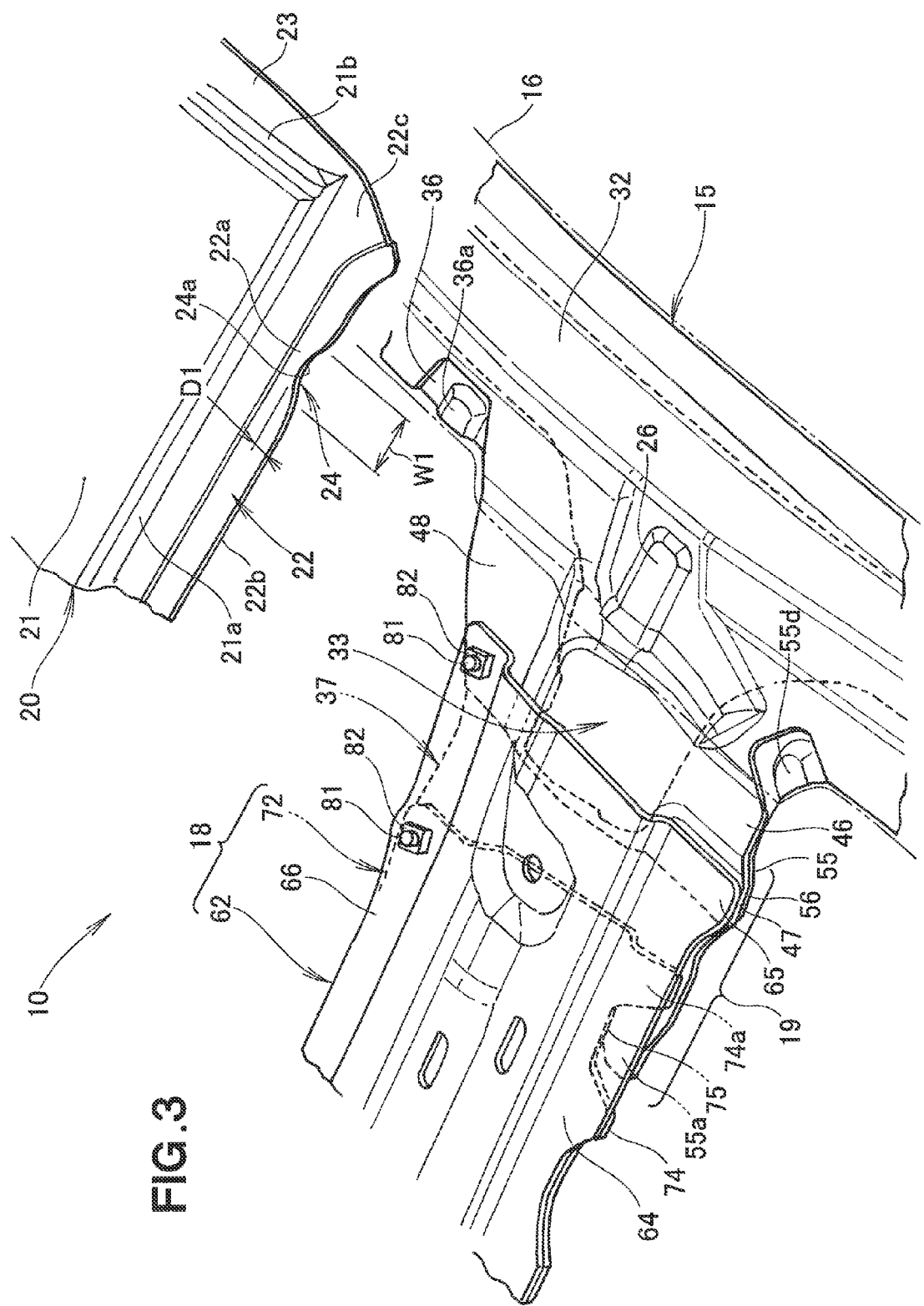
FIG. 3 is a perspective view of the vehicular side structure of FIG. 2 with a roof panel disconnected therefrom

As shown in FIG. 2 and FIG. 3, the roof panel 20 includes a panel body 21 covering a top surface of the arch assembly 18, a front roof flange (roof flange) 22 protruding forwardly of the vehicle body from a front end 21a of the panel body 21, and a side roof flange 23 protruding laterally outwardly of the vehicle body from a side portion 21b of the panel body 21.

The front roof flange 22 is a projecting piece protruding forwardly of the vehicle body from the front end 21a of the panel body 21. The front roof flange 22 extends laterally of the vehicle body along the arch assembly 18. The front roof flange 22 is joined to the arch assembly 18 by spot welding.

The front roof flange 22 has a vicinity 22a to the rail assembly 15 (more specifically outer and inner portions 32, 36 of the rail assembly 15), and the vicinity 22a has a roof recess 24 formed thereon. The roof recess 24 is a recess extending rearwardly of the vehicle body by a distance (depth) D1 from a front edge 22b of the front roof flange 22. The roof recess 24 has its width W1. The vicinity 22a is a portion corresponding to an outer projection 47, an upper projection 65 and an inner projection 56 which are detailed later, and the roof recess 24 is contoured to avoid the outer projection 47, the upper projection 65 and the inner projection 56.

The side roof flange 23 is a projecting piece protruding laterally outwardly of the vehicle body from the side portion 21b of the panel body 21. The side roof flange 23 extends in the front-and-rear direction of the vehicle body along the rail assembly 15 and is coupled to the rail assembly 15 by spot welding.

Figure 4:
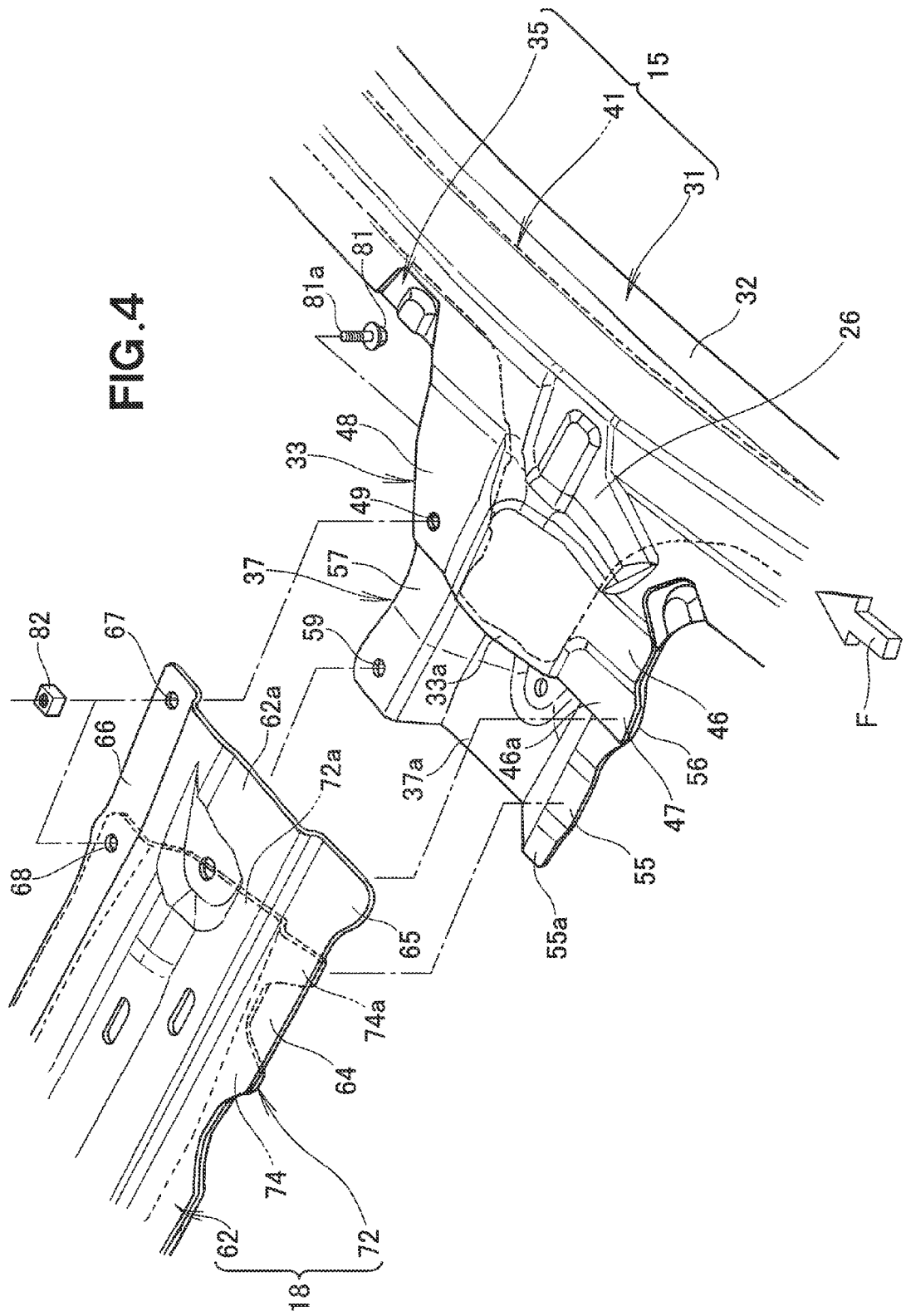
FIG. 4 is a perspective view of the vehicular side structure of FIG. 2 as the structure is disassembled into a rail assembly and an arch assembly.

As shown in FIG. 1, the rail assembly 15 is supported by the upper ends 12a of the front pillar 12 and the upper end 13a of the center pillar 13 and defines the upper part of the side structure 10 of the vehicle body. As shown in FIG. 4, the rail assembly 15 includes an outer member 31 extending in the front-and-rear direction of the vehicle body and located laterally outwardly of the vehicle body. The rail assembly 15 also includes an inner member 35 disposed closer to a lateral center of the vehicle body than the outer member 31. The rail assembly 15 further includes a patch member 41 (FIG. 6) interposed between the outer member 31 and the inner member 35.

Figure 5:
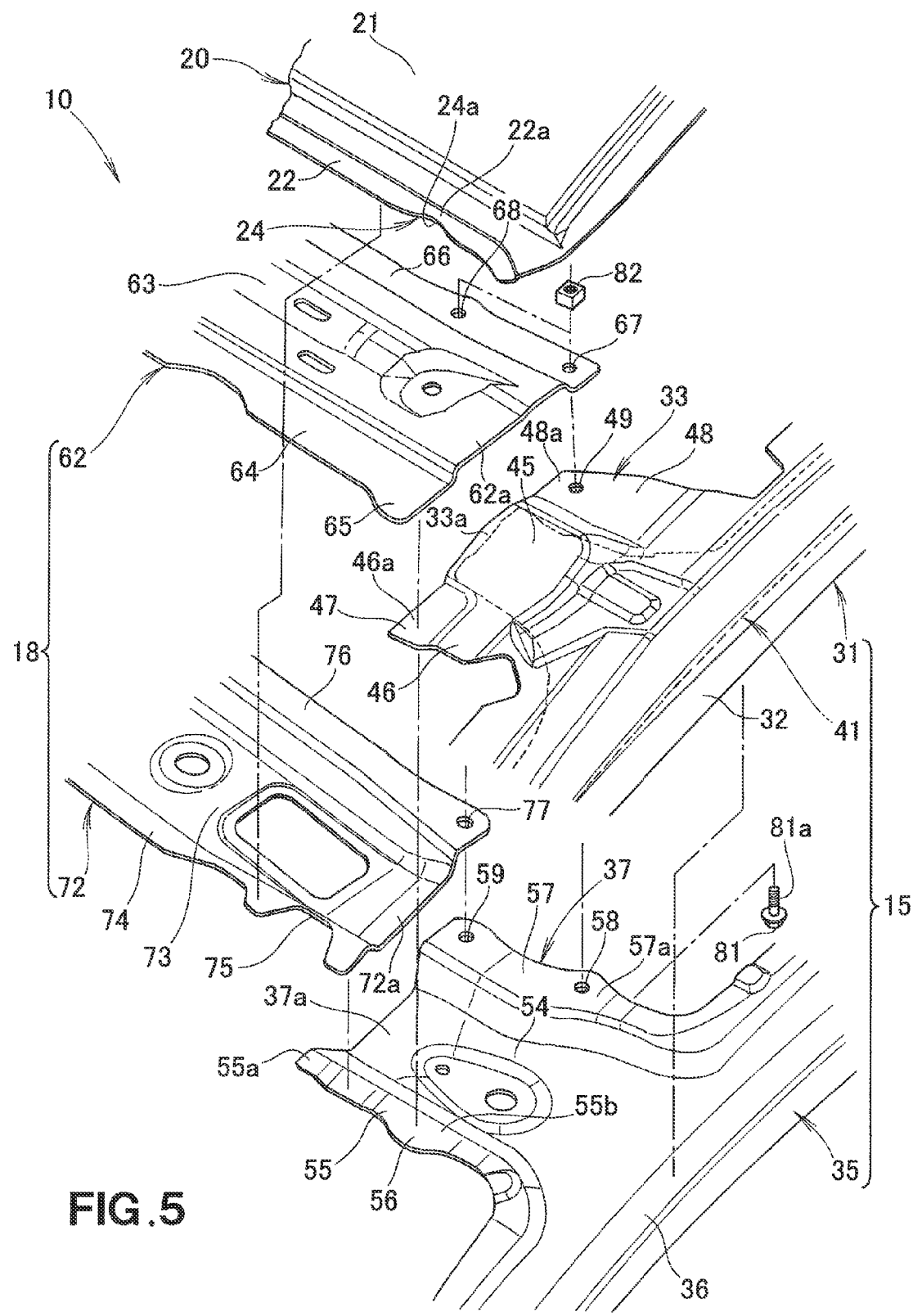
FIG. 5 is an exploded perspective view of the vehicular side structure of FIG. 2.
Figure 6:
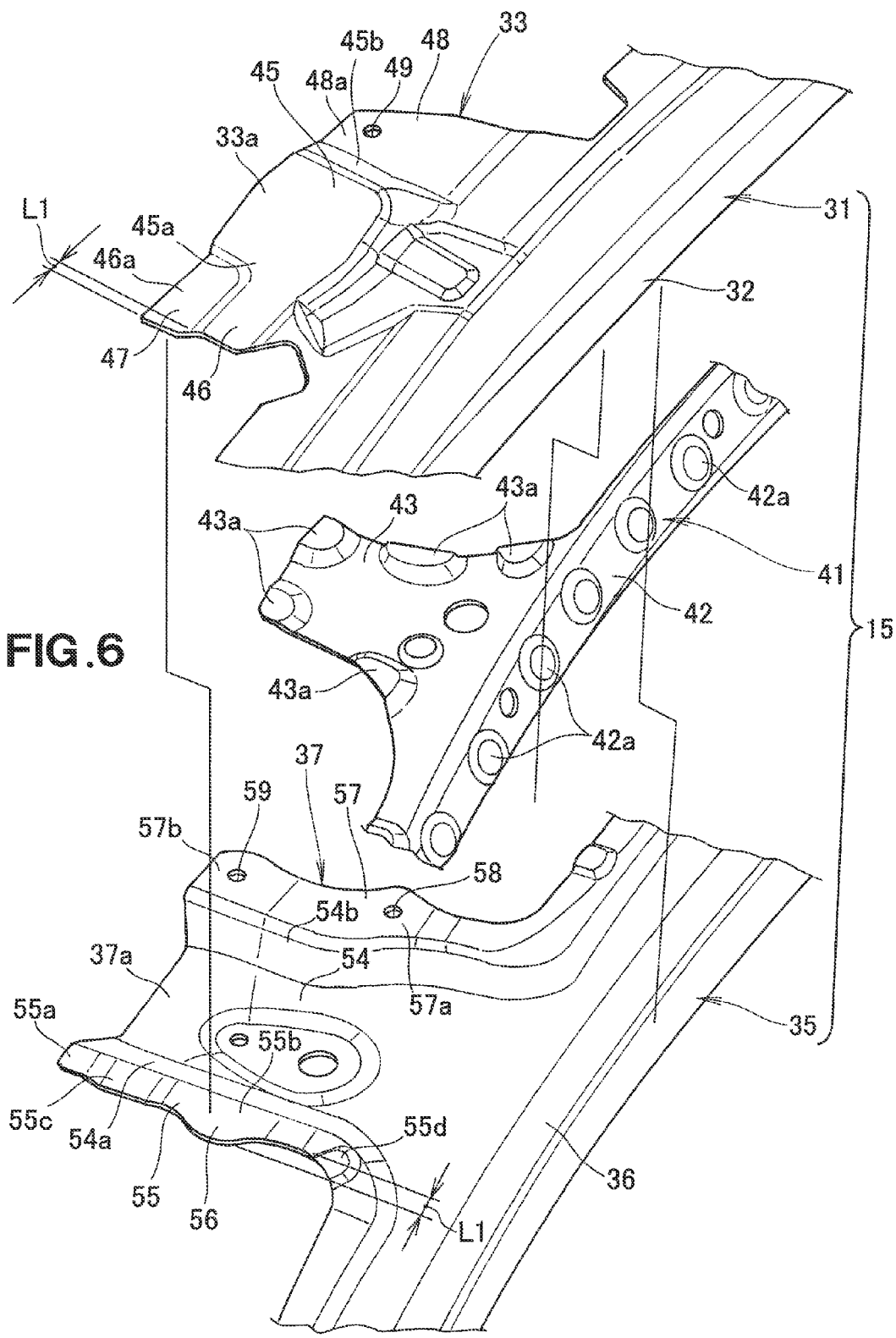
FIG. 6 is an exploded perspective view of the rail assembly shown in FIG. 4.

As shown in FIG. 5 and FIG. 6, the outer member 31 includes an outer portion 32 extending in the front-and-rear direction of the vehicle body and located laterally outwardly of the vehicle body. The outer member 31 also includes an outer extension portion 33 formed integrally with the outer portion 32 and extends laterally of the vehicle body.

The outer extension portion 33 formed integrally with the outer portion 32 and extending laterally of the vehicle body has a lateral inner end 33a overlapping a lateral outer end 62a of an upper member 62 of the arch assembly 18.

The outer extension portion 33 includes an extension body 45 extending from the outer portion 32 toward the lateral center of the vehicle body. The outer extension portion 33 also includes a front outer flange (outer flange) 46 protruding forwardly of the vehicle body from a front end 45a of the extension body 45. The outer extension portion 33 further includes a rear outer flange 48 protruding rearwardly of the vehicle body from a rear end 45b of the extension body 45.

The front outer flange 46 extends laterally of the vehicle body in overlapping relationship to a front upper flange (upper flange) 64 of the upper member 62. The front outer flange 46 has a lateral inner end 46a including the outer projection 47. The outer projection 47 protrudes a distance (height) L1 such that the outer projection 47 underlies the upper projection 65 in overlapping relationship thereto. The rear outer flange 48 has a lateral inner end 48a defining an outer attachment hole 49.

The inner member 35 of the rail assembly 15 includes the inner portion 36 located closer to the lateral center of the vehicle body than the outer portion 32 and extending in the front-and-rear direction of the vehicle body as does the outer portion 32. The inner member 35 also includes an inner extension portion 37 formed integrally with the inner portion 36 and extends towards the lateral center of the vehicle body. The outer portion 32 and the inner portion 36 is substantially the same in length. The outer portion 32 cooperates with the inner portion 36 to define a closed cross-sectional structure extending in the front-and-rear direction of the vehicle body.

The inner extension portion 37 formed integrally with the inner portion 36 and extending toward the lateral center of the vehicle body has a lateral inner end 37a overlapping a lateral outer end 72a of a lower member 72 of the arch assembly 18.

The lateral inner end 37a of the inner extension portion 37 is located closer to the lateral center of the vehicle body than the lateral inner end 33a of the outer extension portion 33. The outer extension portion 33 overlaps the inner extension portion 37 such that the outer extension portion 33 cooperates with the inner extension portion 37 to define a closed cross-sectional structure.

The inner extension portion 37 includes an extension body 54 extending from the inner portion 36 toward the lateral center of the vehicle body. The inner extension portion 37 also includes a front inner flange (inner flange) 55 protruding forwardly of the vehicle body from a front end 54a of the extension body 54. The inner extension portion 37 further includes a rear inner flange protruding rearwardly of the vehicle body from a rear end 54b of the extension body 54.

The front inner flange 55 extends laterally of the vehicle body such that the front inner flange 55 underlies a front lower flange (lower flange) 74 in overlapping relationship to the front lower flange 74. The front inner flange 55 has a lateral inner end 55a located in a lower flange recess 75 (as will be discussed later). The front inner flange 55 includes the inner projection 56 at a lateral center 55b thereof. The inner projection 56 underlies the outer projection 47 in overlapping relationship thereto. The inner projection 56 protrudes a height L1. The rear inner flange 57 has a first inner attachment hole 58 formed through a lateral center 57a of the rear inner flange 57 and a second inner attachment hole 59 formed through a lateral inner end 57b of the rear inner flange 57.

The patch member 41 includes a reinforcing rail patch 42 disposed between the outer portion 32 and the inner portion 36. The patch member 41 also includes a patch extension portion 43 formed integrally with the reinforcing rail patch 42.

The reinforcing rail patch 42 extends in the front-and-rear direction of the vehicle body within the closed cross-sectional structure defined by the outer portion 32 and the inner portion 36. The reinforcing rail patch 42 has a plurality of joined portions 42a coupled to an interior surface of the outer portion 32 by spot welding. The coupling of the reinforcing rail patch 42 to the interior surface of the outer portion 32 by the spot welding reinforces the outer portion 32.

The patch extension portion 43 is formed integrally with the reinforcing rail patch 42 and extends within the closed cross-sectional structure defined by the outer extension portion 33 and the inner extension portion 37. The patch extension portion 43 has a plurality of joined portions 43a coupled to an interior surface of the outer extension portion 33 by spot welding. The coupling of the patch extension portion 43 to the interior surface of the outer extension portion 33 by the spot welding reinforces the outer extension portion 33.

By the rail patch 42 reinforcing the outer portion 32 and by the patch extension portion 43 reinforcing the outer extension portion 33, rigidity of the rail assembly 15 can increase to thereby assure that the side structure of the vehicle body is rigid.

Figure 7:
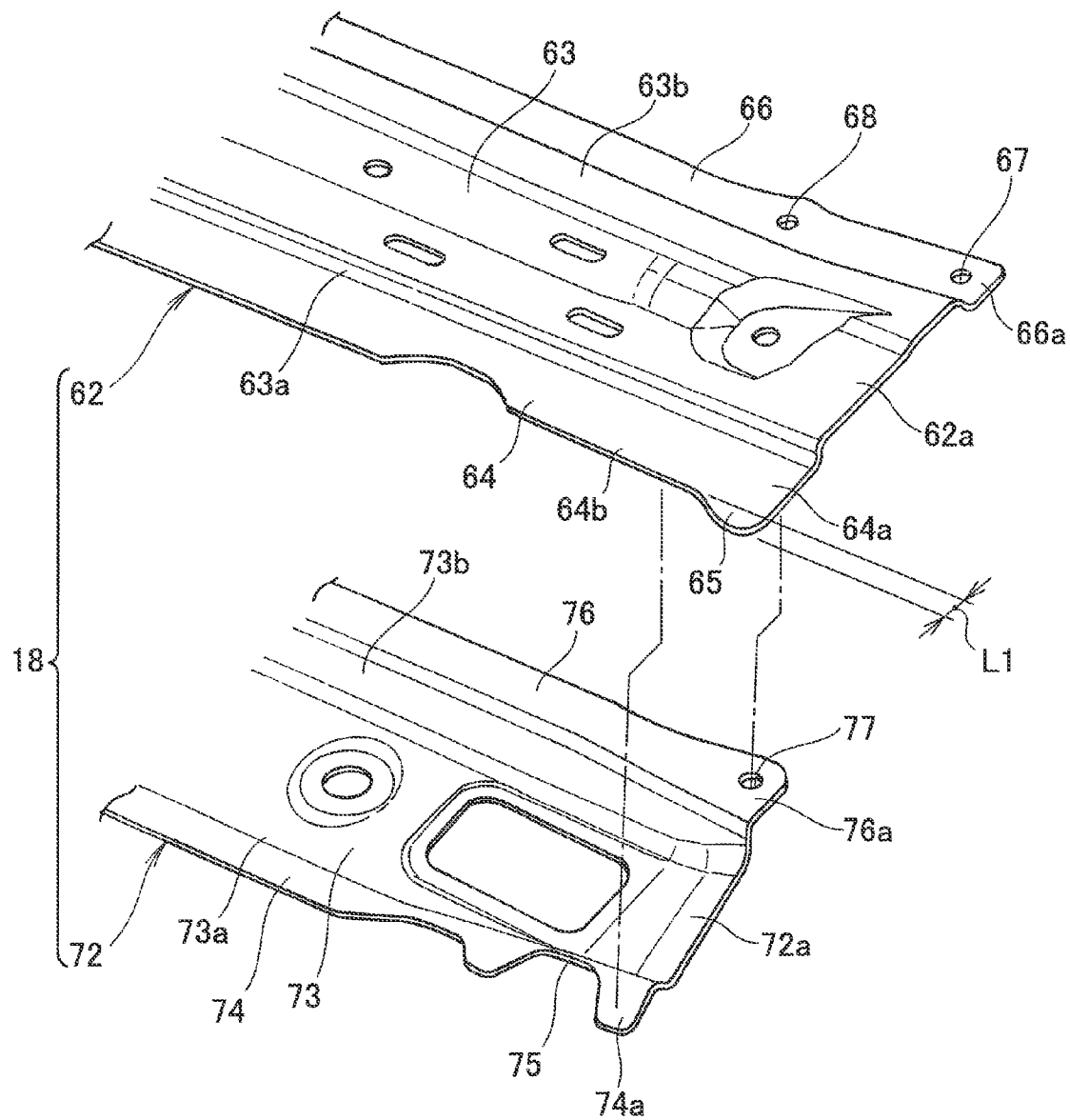
FIG. 7 is an exploded perspective view of the arch assembly shown in FIG. 4.

As shown in FIG. 5 and FIG. 7, the arch assembly 18 includes the upper member 62 adapted to be connected to the lateral inner end 33a of the outer extension portion 33, and the lower member 72 adapted to be connected to the lateral inner end 37a of the inner extension portion 37.

The upper member 62 of the arch assembly 18 is a beam member disposed above the lower member 72 and having its lateral outer end 62a adapted to be carried on a top surface of the outer extension portion 33. The upper member 62 includes an upper body 63 extending laterally of the vehicle body. The upper member 62 also includes the front upper flange 64 protruding forwardly of the vehicle body from a front end 63a of the upper body 63. The upper member 62 further includes a rear upper flange 66 protruding rearwardly of the vehicle body from a rear end 63b of the upper body 63.

The front upper flange 64 extends laterally of the vehicle body such that the front upper flange 64 underlies the front roof flange 22 in overlapping relationship to the front roof flange 22. The front upper flange 64 has a lateral outer end 64a including the upper projection 65 protruding forwardly of the vehicle body.

The upper projection 65 protrudes forwardly of the vehicle body by a distance (height) L1 from a front edge 64b of the front upper flange 64. The upper projection 65 is in a location corresponding to the roof recess 24 such that the upper projection 65 protrudes forwardly of the vehicle body beyond a bottom 24a of the roof recess 24.

The rear upper flange 66 has a first upper attachment hole 67 formed through a lateral outer end 66a thereof and a second upper attachment hole 68 formed closer to the lateral center of the vehicle body than the first upper attachment hole 67.

The lower member 72 of the arch assembly 18 is disposed below the upper member 62 and has the lateral outer end 72a adapted to be carried on a top surface of the lateral inner end 37a of the inner extension portion 37. The upper member 62 and the lower member 72 overlap to thereby define a closed cross-sectional structure extending laterally of the vehicle body.

The lower member 72 includes a lower body 73 extending laterally of the vehicle body and the front lower flange 74 protruding forwardly of the vehicle body from a front end 73a of the lower body 73. The lower member 72 also includes a rear lower flange 76 protruding rearwardly of the vehicle body from a rear end 73b of the lower body 73.

The front lower flange 74 extends laterally of the vehicle body such that the front lower flange 74 underlies the front upper flange 64 in overlapping relationship to the front upper flange 64. The front lower flange 75 has the lower flange recess 75 located closer to the lateral center of the vehicle body than a roof side spot welding region (discussed later) 92. The rear lower flange 76 has a lower attachment hole 77 formed through a lateral outer end 76a thereof.

As shown in FIG. 4 and FIG. 5, the upper member 62 is brought into overlapping relationship to the lower member 72 with the outer extension portion 33 overlapping the inner extension portion 37. In so doing, the lateral outer end 62a of the upper member 62 is brought to overlie the lateral inner end 33a of the outer extension portion 33 in overlapping relationship to the lateral inner end 33a. Simultaneously, the lateral outer end 72a of the lower member 72 is brought to overlie the lateral inner end 37a of the inner extension portion 37 in overlapping relationship to the lateral inner end 37a.

In this state, a bolt 81 is inserted through the first inner attachment hole 58 of the rear inner flange 57, the outer attachment hole 49 of the rear outer flange 48 and the first upper attachment hole 67 of the rear upper flange 66, after which a nut 82 threadedly engages a threaded shank 81a of the bolt 81 projecting out of the first upper attachment hole 67. The nut 82 is welded to a surface of the rear upper flange 66 in coaxial relationship to the first upper attachment hole 67.

Then, a bolt 81 is inserted through the second inner attachment hole 59 of the rear inner flange 57, the lower attachment hole 77 of the rear lower flange 76 and the second upper attachment hole 68 of the rear upper flange 66, after which a nut 82 threadedly engages a threaded shank 81a of the bolt 81 projecting out of the second upper attachment hole 68. The nut 82 is welded to the surface of the rear upper flange 66 in coaxial relationship to the second upper attachment hole 68.

As shown in FIG. 2 and FIG. 3, the front roof flange 22, the front upper flange 64 and the front lower flange 74 are spot welded to one another. The front outer flange 46 and the front inner flange 55 are coupled together by spot welding.

Spot welding the front roof flange 22, the front upper flange 64, the front lower flange 74, the front outer flange 46 and the front inner flange 55 will be detailed with reference to FIG. 8 to FIG. 17.

Figure 8:
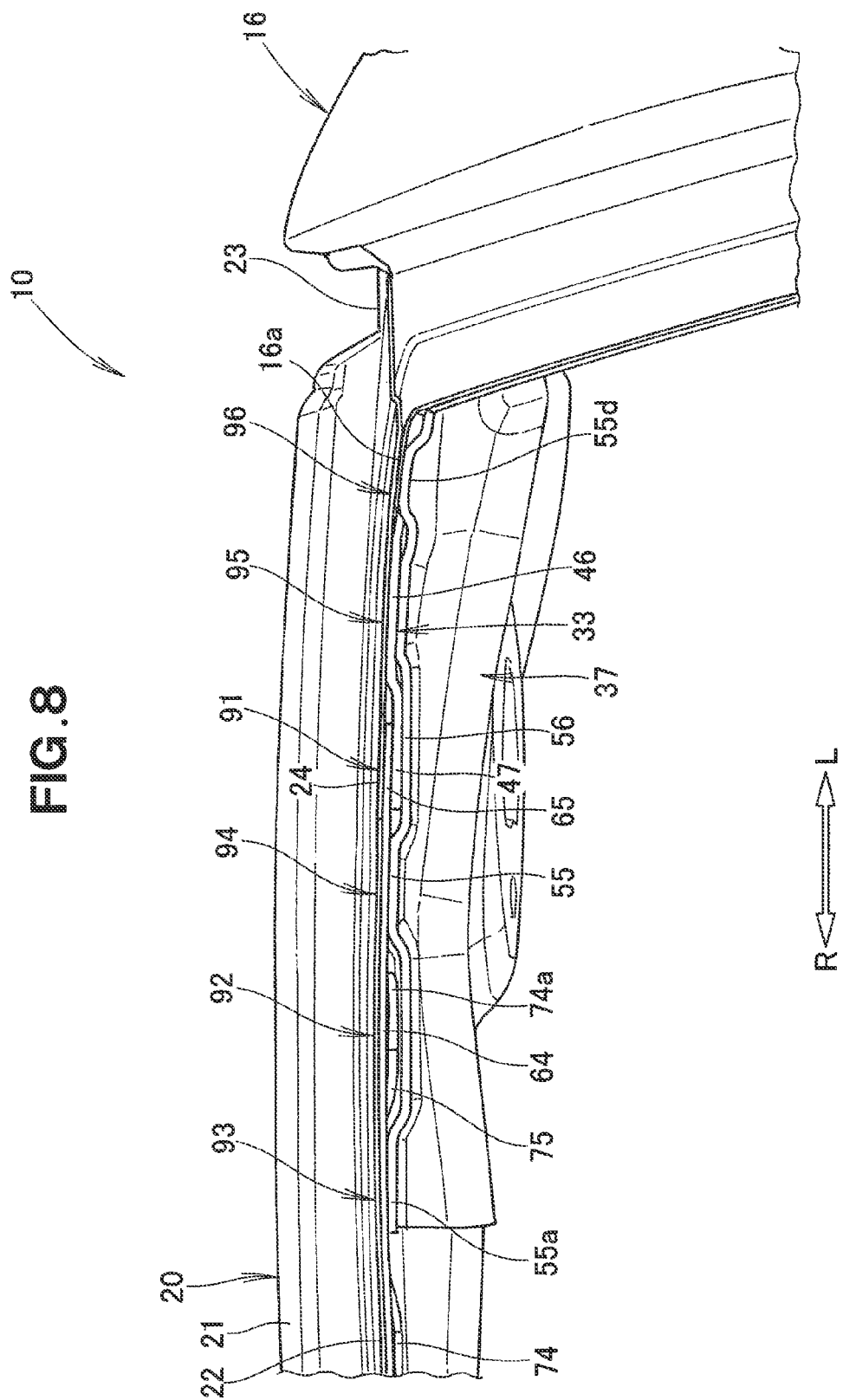
FIG. 8 is a view taken in a direction of an arrow 8 of FIG. 1.
Figure 9:
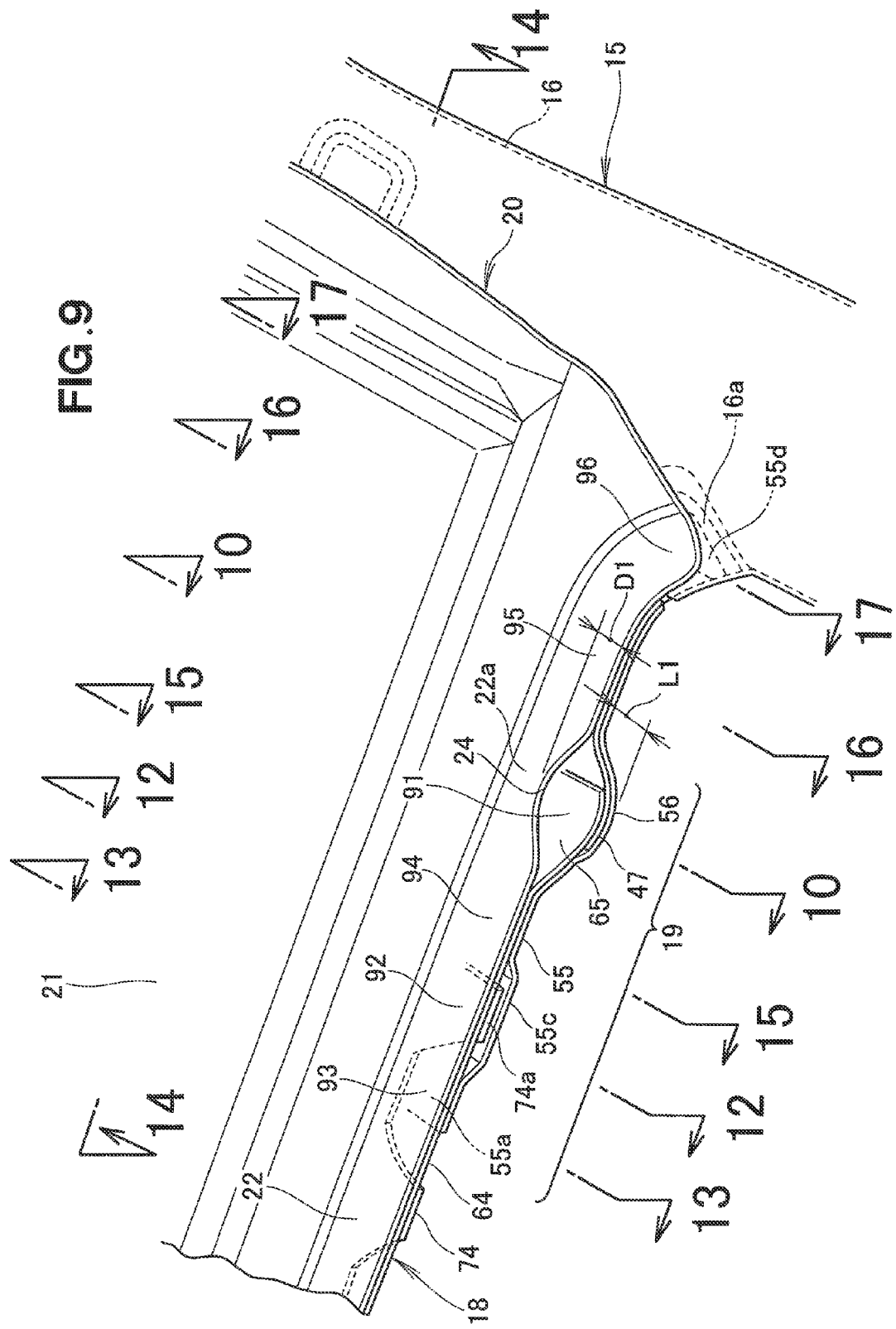
FIG. 9 is an enlarged view of a region 9 of FIG. 2.

As shown in FIG. 8 and FIG. 9, the side structure 10 of the vehicle body provides a first spot welding region 91, the roof side spot welding region 92 located closer to the lateral center of the vehicle body than the first spot welding region 91, and a second spot welding region 93 located closer to the lateral center of the vehicle body than the roof side spot welding region 92. The side structure 10 of the vehicle body also provides a third spot welding region 94 located between the first spot welding region 91 and the roof side spot welding region 92. The side structure 10 of the vehicle body further provides a fourth spot welding region 95 located laterally outwardly of the first spot welding region 91, and a side spot welding region 96 located laterally outwardly of the fourth spot welding region 95.

As shown in FIG. 5 and FIG. 9, the front upper flange 64 includes the upper projection 65 protruding forwardly of the vehicle body more than the front roof flange 22. The front outer flange 46 includes the outer projection 47 underlying the upper projection 65 in overlapping relationship to the upper projection 65. The front inner flange 55 includes the inner projection 56 underlying the outer projection 47 in overlapping relationship to the outer projection 47.

Figure 10:
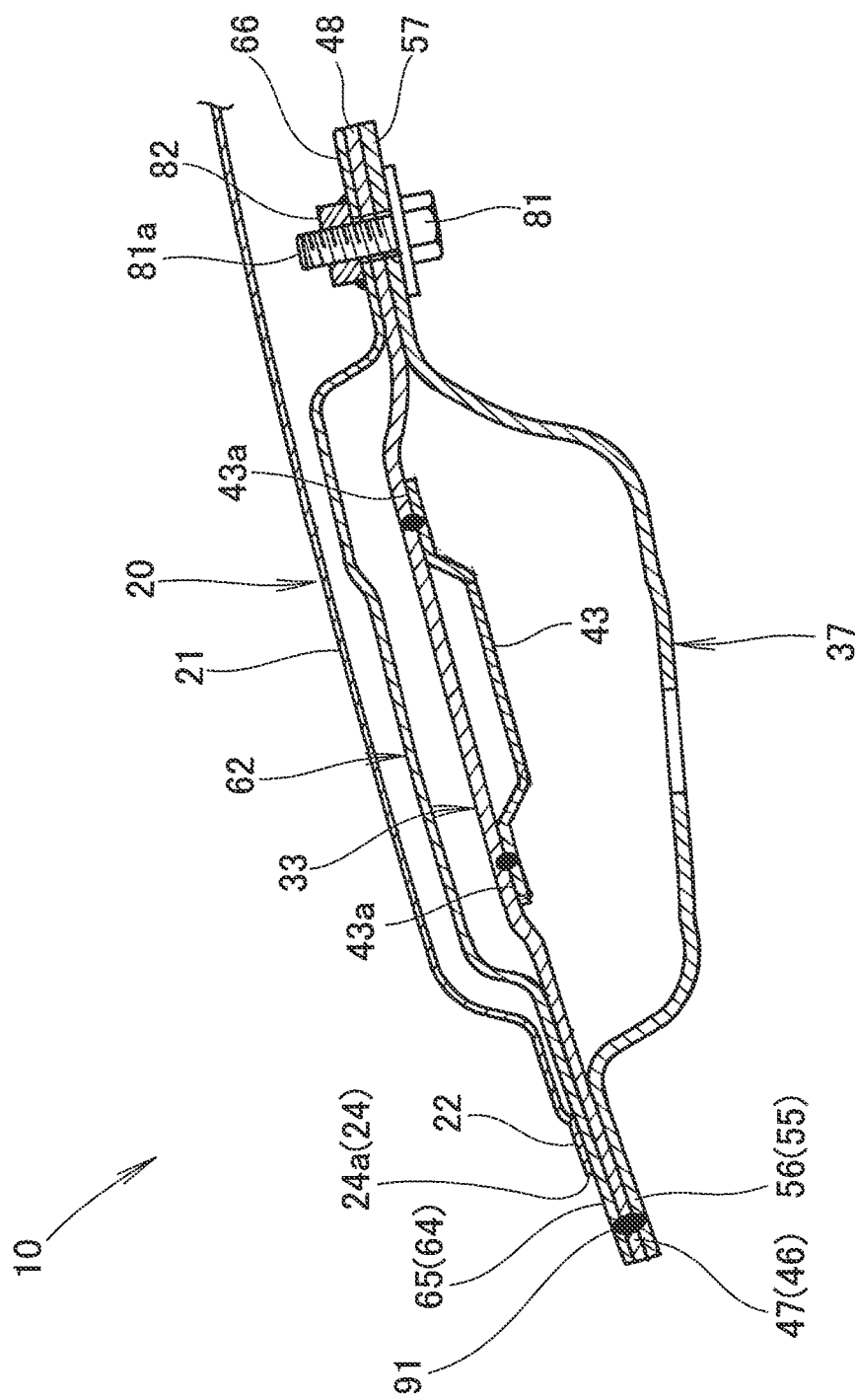
FIG. 10 is a cross-sectional view taken along line 10-10 of FIG. 9.

In other words, three projections, that is, the upper projection 65, the outer projection 47 and the inner projection 56 protrude forwardly of the vehicle body more than the front roof flange 22. As shown in FIG. 10, these three projections 65, 47, 56 are spot welded to one another in the first spot welding region 91.

Figure 11:
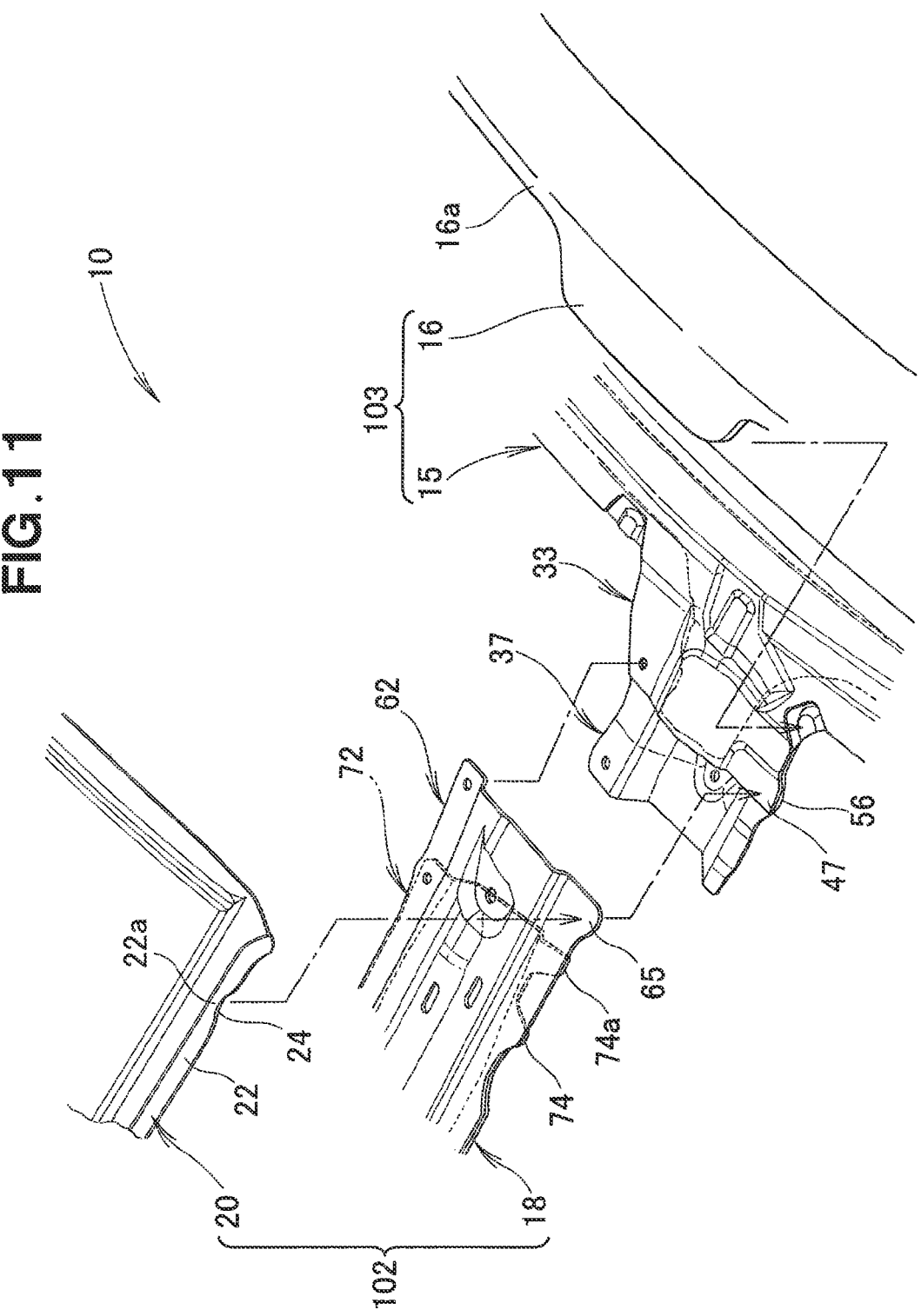
FIG. 11 is a view showing steps of assembling the vehicular side structure according to the present invention.
Figure 12:
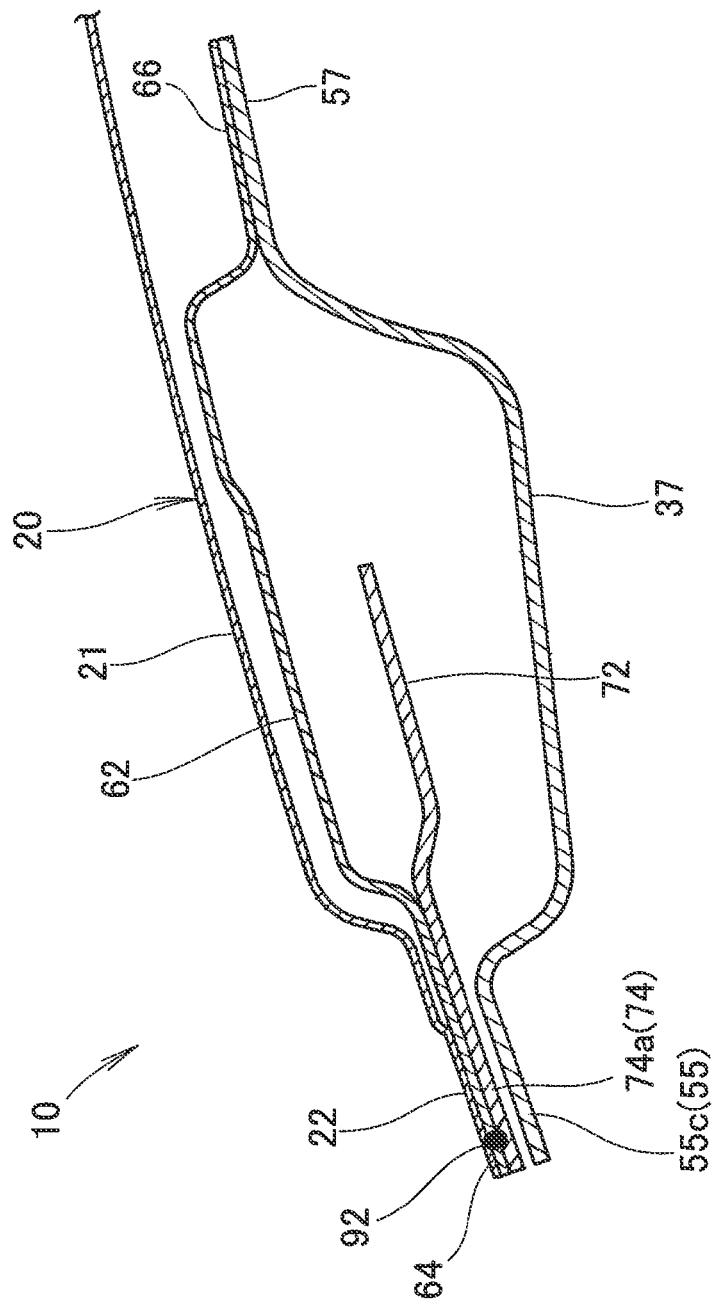
FIG. 12 is a cross-sectional view taken along line 12-12 of FIG. 9.

In assembling the side structure 10 of the vehicle body, as shown in FIG. 11, the roof panel 20 and the arch assembly 18 are assembled together into a roof unit 102. Meanwhile, the rail assembly 15 and the side panel 16 are assembled together into a rail unit 103. Thereafter, the roof unit 102 and the rail unit 103 may be assembled together such that the three projections 65, 47, 56 protrude forwardly of the vehicle body more than the front roof flange 22 and are spot welded together to define the first spot welding region 91 (FIG. 2 and FIG. 9).

Typically, when a plurality of sheets is to be spot welded together, the number of the sheets is preferably limited to three in order to ensure that the sheets are coupled together. With this in mind, as shown in FIG. 10, the number of the projections spot welded together in the first spot welding region 91 is three, that is, a strong coupling among the upper projection 65, the outer projection 47 and the inner projection 56 can be achieved by the spot welding. The strong coupling of the upper member 62 (i.e., the arch assembly 18) to the outer extension portion 33 and the inner extension 37 ensures sufficient rigidity of the side structure 10 of the vehicle body.

As shown in FIG. 9, the front roof flange 22 has the vicinity 22a to the rail assembly 15, and the vicinity 22 corresponds to the outer projection 47, the upper projection 65 and the inner projection 56 defines the roof recess 24. The roof recess 24 is contoured to avoid the outer projection 47, the upper projection 65 and the inner projection 56, such that the outer projection 47, the upper projection 65 and the inner projection 56 protrude a reduced distance ("height") L1. By virtue of these projections 47, 65, 56, the side structure 10 of the vehicle protrudes toward a windshield (not shown) by a reduced distance to improve aesthetic design of the side structure 10.

Since the outer projection 47, the upper projection 65 and the inner projection 56 protrude forwardly of the vehicle body more than the front roof flange 22, the depth D1 of the roof recess 24 need not be so great as to allow the projections 47, 65, 56 to have a spot welding region. That is, the depth D1 can be small because the projections 47, 65, 56 protrude by a distance sufficient to have a spot welding region.

Since the rood recess 24 has the small depth D1, it is possible to prevent concentration of stress on the roof recess 24, i.e., to prevent deformation beginning at the roof recess 24. Thus, sufficient rigidity of the side structure 10 of the vehicle is ensured.

As shown in FIG. 3 and FIG. 9, the roof side spot welding region 92 is located closer to the lateral center of the vehicle body than the first spot welding region 91. In the roof side spot welding region 92, three flanges, that is, the front roof flange 22, the front upper flange 64 and the front lower flange 74 (a lateral outer end 74a) are spot welded to one another. As the roof panel 20 and the arch assembly 18 are assembled together into the roof unit 102, the three flanges 22, 64, 74 are spot welded to one another to define the roof side spot welding region 92.

Since the three flanges 22, 64, 74 are spot welded together, the flanges 22, 64, 74 can be firmly coupled to one another to thereby sufficient coupling strength of the roof unit 102.

The front inner flange 55 has a downwardly projecting portion 55c at a location corresponding to the front lower flange 74 (the lateral outer end 74a). The downwardly projecting portion 55c avoids interfering the roof side spot welding region 92.

As shown in FIG. 3 and FIG. 9, the front lower flange 74 has the lower flange recess 75. The lower flange recess 75 is located closer to the lateral center of the vehicle body than the rood side spot welding region 92. The lateral inner end 55a of the front inner flange 55 terminates in the lower flange recess 75.

Figure 13:
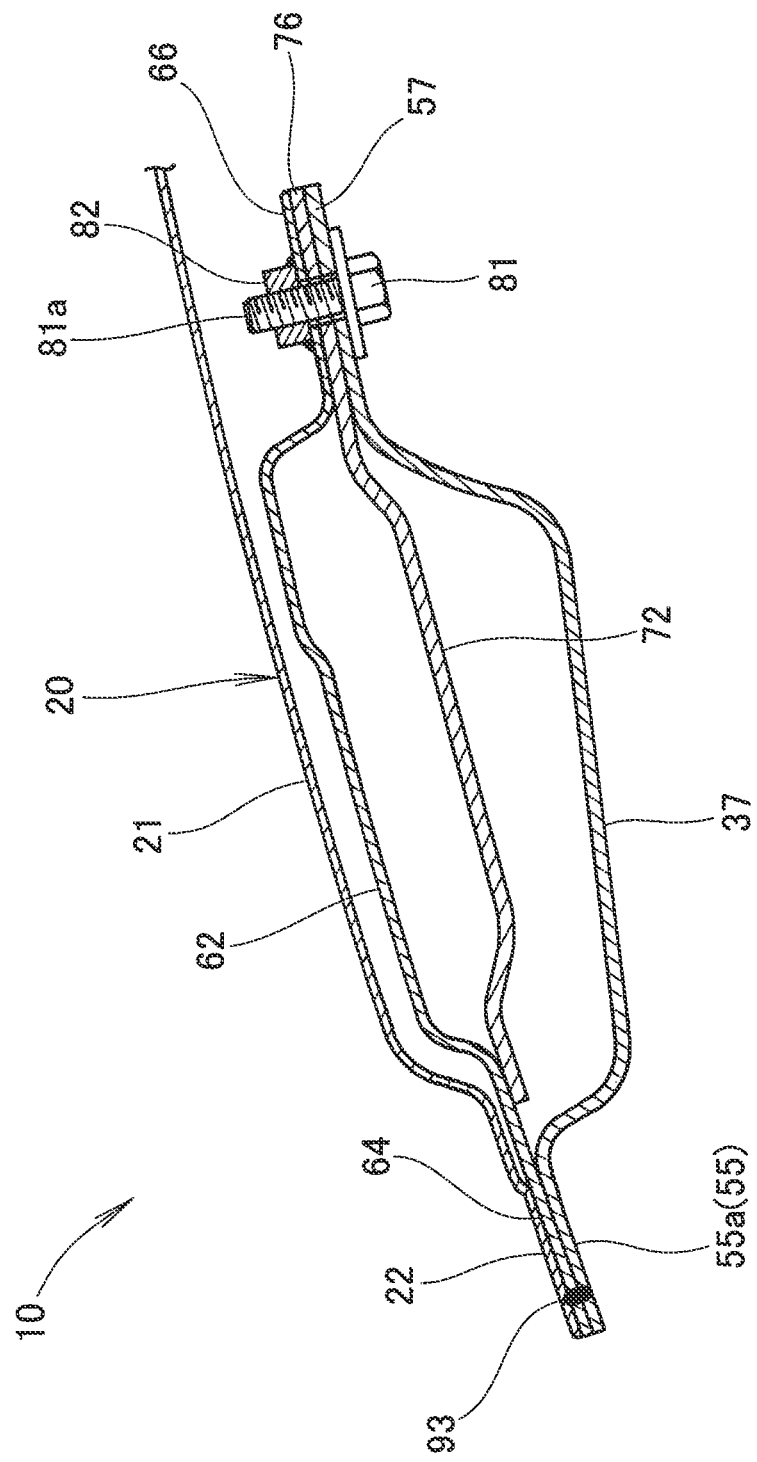
FIG. 13 is a cross-sectional view taken along line 13-13 of FIG. 9.
Figure 14:
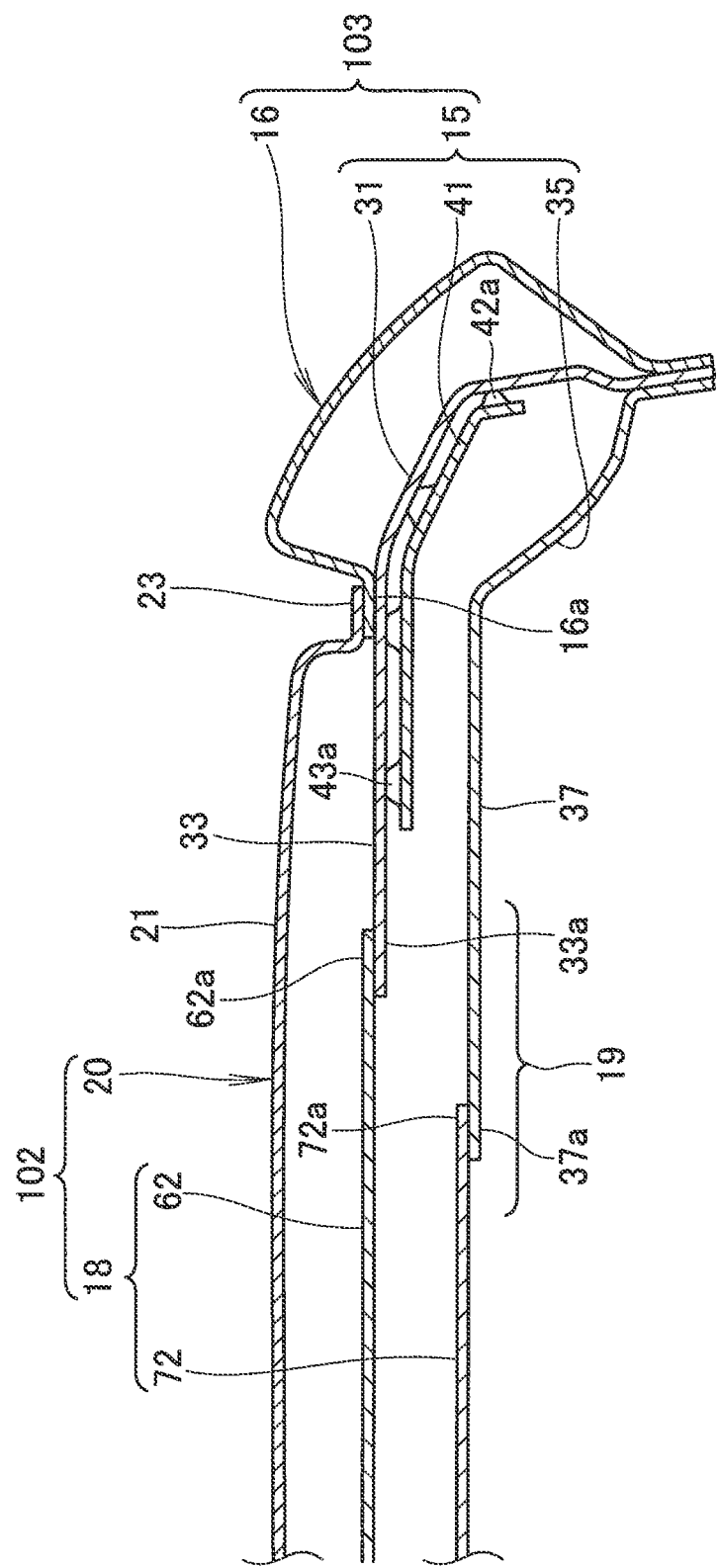
FIG. 14 is a cross-sectional view taken along line 14-14 of FIG. 9.

As shown in FIG. 13, the front roof flange 22, the front upper flange 64 and the front inner flange 55 are spot welded to one another in the second spot welding region 93 located near the roof side spot welding region 92 and in the lower flange recess 75. Since these three flanges 22, 64, 55 are spot welded together, the flanges 22, 64, 55 can be firmly coupled together.

In the roof side spot welding region 92, the front upper flange 64 and the front lower flange 74 (the lateral outer end 74a) are spot welded to each other. In the second spot welding region 93, the front upper flange 64 and the front inner flange 55 are spot welded to each other. Since the second spot welding region 93 is located near the roof side spot welding region 92, the front inner flange 55 (the inner extension portion 37) is kept horizontally continuous relative to the front lower flange 74 (the lower member 72), thereby providing a connection 19 between the rail assembly 15 and the arch assembly 18 with a closed cross-section. By virtue of the closed cross-section of the connection 19, sufficient rigidity of the connection 19 is ensured.

To assemble the side structure 10 of the vehicle body, the arch assembly 18 and the roof panel 20 are assembled together into the roof unit 102, and the rail assembly 15 and the side panel 16 are assembled together into the rail unit 103.

Thereafter, the roof unit 102 and the rail unit 103 are assembled together.

The assemblage of the roof unit 102 and the rail unit 103 requires carrying the lateral outer end 62a of the upper member 62 onto the lateral inner end 33a of the outer extension portion 33 such that the lateral outer end 62a overlies the lateral inner end 33a while carrying the lateral outer end 72a of the lower member 72 onto the lateral inner end 37a of the inner extension portion 37 such that the lateral outer end 72a overlies the lateral inner end 37a. Thus, the roof unit 102 and the rail unit 103 can be assembled together easily after the roof unit 102 is assembled and the rail unit 103.

Figure 15:
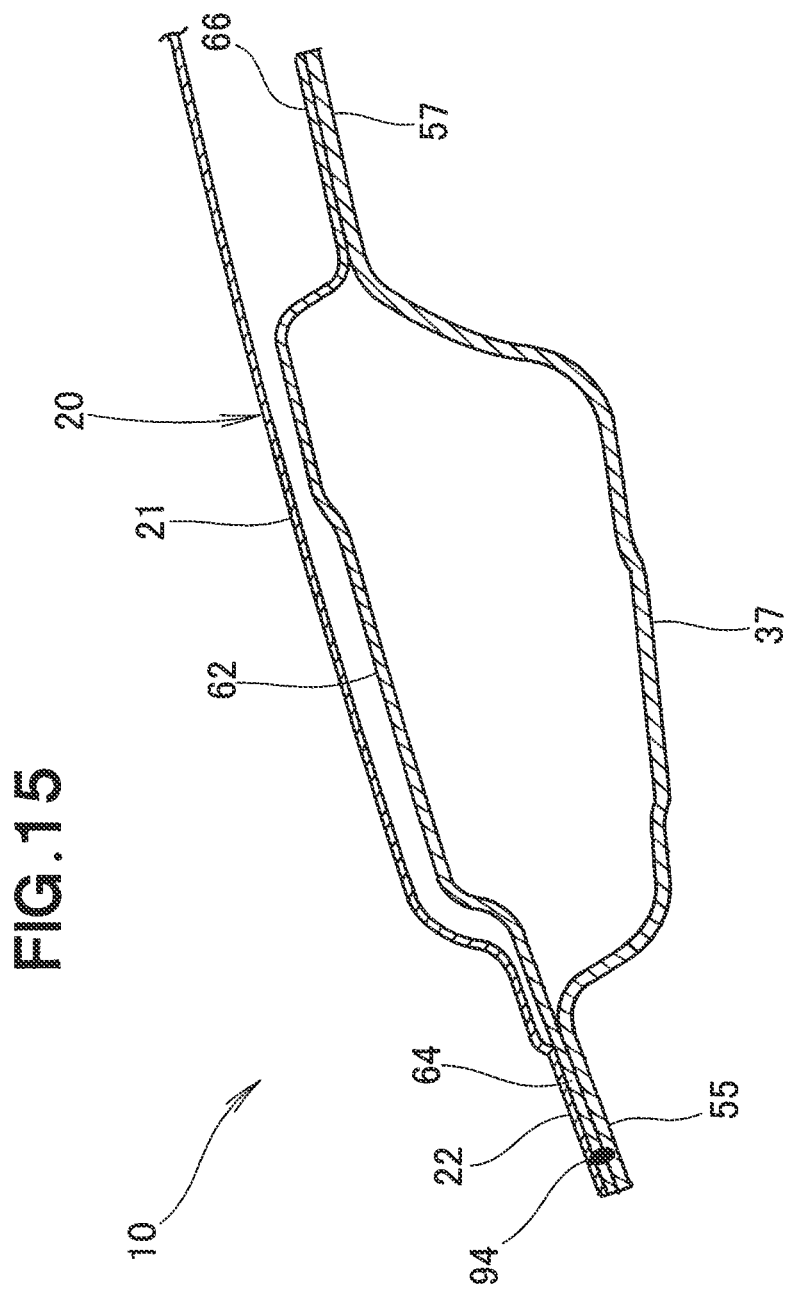
FIG. 15 is a cross-sectional view taken along line 15-15 of FIG. 9.

As shown in FIG. 5 and FIG. 9, the third spot welding region 94 is located laterally outwardly of the lower member 72 and closer to the lateral center of the vehicle than the outer extension portion 33. The third spot welding region 94 is a region where the three flanges, that is, the front roof flange 22, the front upper flange 64 and the front inner flange 55 are spot welded to one another, as shown in FIG. 15. Since these three flanges 22, 64, 55 are spot welded together, the flanges 22, 64, 55 can be firmly coupled together. The third spot welding region 94 is located closer to the lateral center of the vehicle body than the first spot welding region 91.

Figure 16:
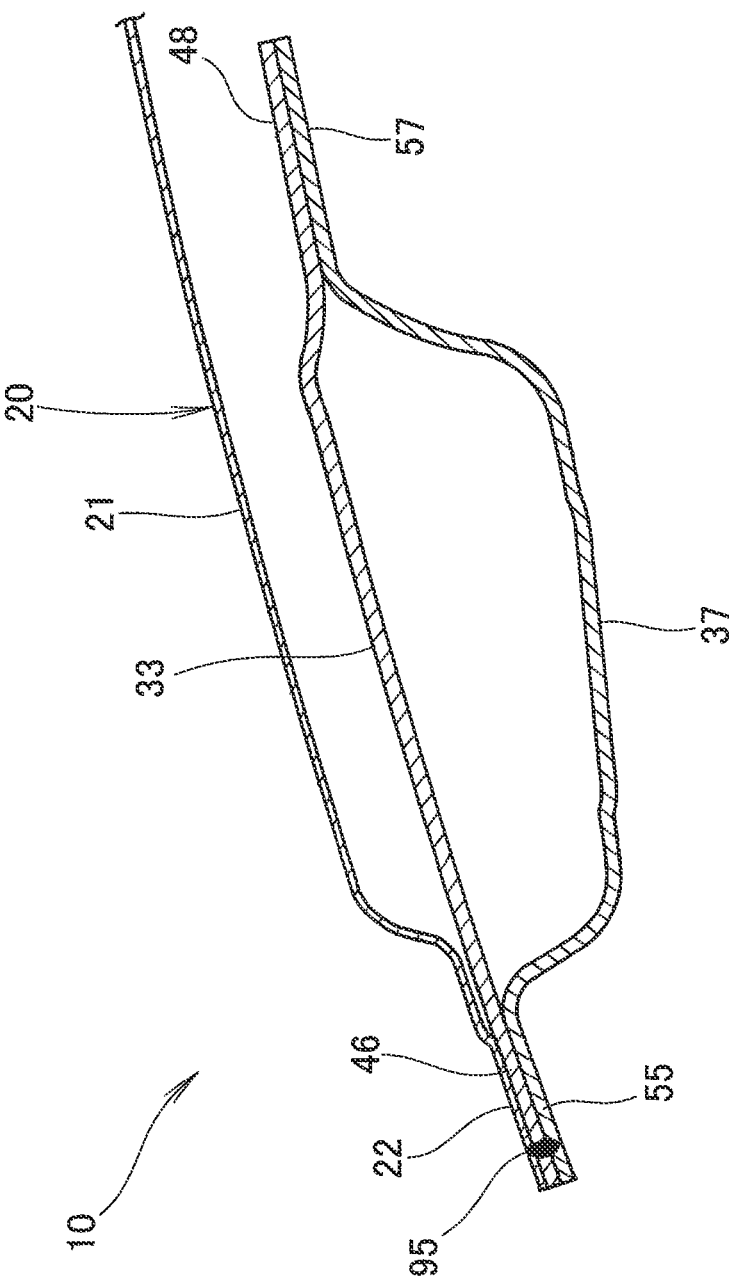
FIG. 16 is a cross-sectional view taken along line 16-16 of FIG. 9.

The fourth spot welding region 95 is located laterally outwardly of the upper member 62. The fourth spot welding region 95 is a region where the three flanges, that is, the front roof flange 22, the front outer flange 46 and the front inner flange 55 are spot welded to one another, as shown in FIG. 16. Since these three flanges 22, 46, 55 are spot welded together, the flanges 22, 46, 55 can be firmly coupled together.

The fourth spot welding region 95 is located laterally outwardly of the first spot welding region 91, as shown in FIG. 9. The first spot welding region 91 is located between the third spot welding region 94 and the fourth spot welding region 95. No portion of the front roof flange 22 is spot welded in the first spot welding region 91. Since the third and fourth spot welding regions 94, 95 are located on both sides of the first spot welding region 91, the front roof flange 22 is fixed on the both sides of the first spot welding region 91 to thereby provide sufficient coupling strength of the front roof flange 22.

The roof side spot welding region 92 is located between the second spot welding region 93 and the third spot welding region 94. The three flanges, that is, the front roof flange 22, the front upper flange 64 and the front lower flange 74 are spot welded to one another in the roof side spot welding region 92.

In the second and third spot welding regions 93, 94, the three flanges, that is, the front roof flange 22, the front upper flange 64 and the front inner flange 55 are spot welded to one another. Thus, in a region from the second spot welding region 93 through the roof side spot welding region 92 to the third spot welding region 94, the front lower flange 74 can be firmly coupled to the front inner flange 55 via the front roof flange 22 and the front upper flange 64. Since the front lower flange 74 is firmly coupled to the front inner flange 55, the lower member 72 is firmly coupled to the inner extension portion 37.

In the first spot welding region 91, the upper projection 65 and the outer projection 47 are spot welded to each other, and hence the front upper flange 64 can be firmly coupled to the front outer flange 46. Since the front upper flange 64 is firmly coupled to the front outer flange 46, the upper member 62 is firmly coupled to the outer extension portion 33.

Since the lower member 72 is firmly coupled to the inner extension portion 37 while the upper member 62 is firmly coupled to the outer extension portion 33, the arch assembly 18 is coupled to the rail assembly 15 in a preferred manner.

The roof side spot welding region 92 and the second and third spot welding regions 93, 94 are located at given intervals and closer to the lateral center of the vehicle body than the first spot welding region 91. Since the spot welding regions 92, 93, 94 are located away from the first spot welding region 91 toward the lateral center of the vehicle body, a stress applied to the connection 19 between the rail assembly 15 and the arch assembly 19 can be dispersed to the spot welding regions 92, 93, 94 or the first spot welding region 91 in a preferred manner. Thus, sufficient rigidity of the connection 19 between the rail assembly 15 and the arch assembly 18 is ensured.

That is, as shown in FIG. 3 and FIG. 9, the upper member 62 and the outer extension portion 33 are coupled together via the coupling of the upper projection 65 to the outer projection 47 in the first spot welding region 91. The lower member 72 and the inner extension portion 37 are coupled together via the coupling of the front lower flange 74 (the lateral outer end 74a) to the front inner flange 55 (the lateral inner end 55a) in the region from the spot welding regions 93 through the spot welding region 92 to the spot welding region 94.

That is, the first spot welding region 91 in which the upper member 62 and the outer extension portion 33 are coupled together is located away from the spot welding regions 92, 93, 94 in which the lower member 72 is coupled to the inner extension portion 37 through the front upper flange 64. As a result, a stress applied to the connection 19 between the rail assembly 15 and the arch assembly 18 can be dispersed to the spot welding regions 92, 93, 94 or the first spot welding region 91 in a preferred manner. Thus, sufficient rigidity of the connection 19 between the rail assembly 15 and the arch assembly 18 is ensured.

Figure 17:
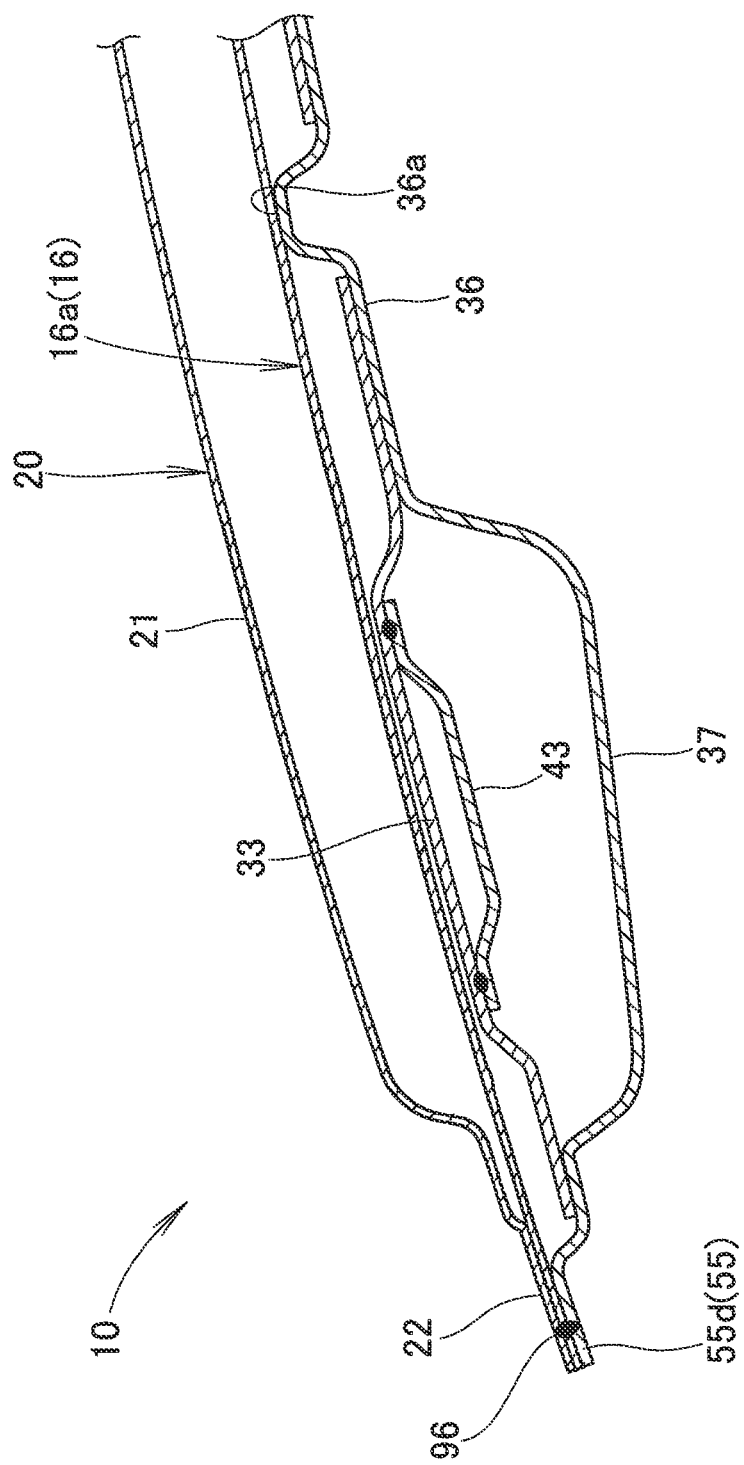
FIG. 17 is a cross-sectional view taken along line 17-17 of FIG. 9.

As shown in FIG. 9, the side spot welding region 96 is located laterally outwardly of the fourth spot welding region 95 and closer to the lateral center of the vehicle body than the inner portion 36 (FIG. 6). As shown in FIG. 17, the side spot welding region 96 is a region where three elements, that is, the front roof flange 22, a side flange 16a of the side panel 16, and a joined portion 55d of the front inner flange 55 are spot welded to one another. Since these three elements 22, 16a, 55d are spot welded together, the three elements 22, 16a, 55d can be firmly coupled together. The side flange 16a of the side panel 16 is coupled to a joined portion 36a of the inner portion 36.

As discussed above, the outer extension portion 33 is formed integrally with the outer portion 32, the inner extension portion 37 is formed integrally with the inner portion 36, and the outer extension portion 33 cooperates with the inner extension portion 37 to define the closed cross-sectional structure, as shown in FIG. 3. The arch assembly 18 has the closed cross-sectional structure defined by the upper member 62 and the lower member 72, as shown in FIG. 7. As shown in FIG. 4, the upper member 62 is adapted to be carried on the top surface of the outer extension portion 33, and the lower member 72 is adapted to be carried on a top surface of the inner extension portion 37.

This means that the arch assembly 18 having the closed cross-sectional structure is adapted to be provided to the outer and inner extension portions 33, 37 having the closed cross-sectional structure, thereby rigidifying the side structure 10 of the vehicle body.

The rail assembly 15 and the arch assembly 18 are arranged substantially perpendicularly to each other. If the rail assembly 15 and the arch assembly 18 were connected to each other at a junction 26 (FIG. 4), a stress would be concentrated on the junction 26 in which case it would be difficult to keep the junction 26 rigid.

In this regard, the outer extension portion 33 is formed integrally with the outer portion 32, and the inner extension portion 37 is formed integrally with the inner portion 36. The upper member 62 is provided on the outer extension portion 33, and the lower member 72 is provided on the inner extension portion 37. This means that the rail assembly 15 is connected to the arch assembly 18 at the connection 19 located away from the junction 26. As a result, the junction 26 can be kept rigid. Thus, a load F (FIG. 4) from a front direction of the vehicle body can be transmitted through the rail assembly 15 and the junction 26 to the arch assembly 18 in a preferred manner.

As shown in FIG. 2, the roof panel 20 is disposed above the arch assembly 18 to cover the arch assembly 18. In placing the roof panel 20 onto the arch assembly 18, the side roof flange 23 of the roof panel 20 and an end 22c of the front roof flange 22 are welded to the outer portion 32 of the rail assembly 15 and the side panel 16 (the side flange 16a).

As shown in FIG. 4, the outer extension portion 33 is formed integrally with the outer portion 32, thereby reducing a fabrication tolerance of the outer portion 32. To the outer portion 32 of the reduced fabrication tolerance, the side roof flange 23 of the roof panel 20 and the end 22c of the front roof flange 22 are welded, as shown in FIG. 2. More specifically, the side roof flange 23 and the end 22c of the front roof flange 22 can be accurately welded to desired locations of the outer portion 32 to thereby accurately position the roof panel 20 in place.

As shown in FIG. 3, additionally, the outer portion 32 extends along the inner portion 36 by substantially the same distance as the inner portion 36 such that the outer portion 32 extends along the entire length of a flange of the roof panel, that is, alongside the side roof flange 23 and the end 22c of the front roof flange 22.

Since the outer portion 32 extends alongside the side roof flange 23 and the end 22c of the front roof flange 22, the side roof flange 23 and the end 22c of the front roof flange 22 can be disposed on the outer portion 32 without spanning a boundary between the outer portion 32 and the inner portion 36. Thus, the side roof flange 23 and the end 22c of the front roof flange 22 (that is, the roof panel 20) can be accurately welded to desired locations of the outer portion 32. As a result, the roof panel 20 can be accurately positioned in place.

It will be appreciated that the vehicle body side structure according to the present invention is not limited to that in the embodiment discussed above but may be modified or improved. For example, the front roof flange 22 of the roof panel 20 need not have the roof recess 24 to allow for the first spot welding region 91. That is, without the roof recess 24 being formed on the front roof flange 22, the upper projection 65, the outer projection 47 and the inner projection 56 may protrude a distance adjusted to allow for the first spot welding region 91. In this case, stress concentration can be prevented more effectively than if the roof recess 24 is formed on the front roof flange 22.

It is noted that elements of the side structure 10 in the embodiment such as the rail assembly 15, the side panel 16, the arch assembly 18, the roof panel 20, the panel body 21, the front roof flange 22, the roof recess 24, the outer portion 32, the outer extension portion 33, the inner portion 36, the inner extension portion 37, the patch member 41, the reinforcing rail patch 42, the patch extension portion 43, the extension body 45 of the outer extension portion, the front outer flange 46, the outer projection 47, the extension body 54 of the inner extension portion, the front inner flange 55, the inner projection 56, the upper member 62, the upper body 63, the front upper flange 64, the upper projection 65, the lower member 72, the lower body 73, the front lower flange 74 and the lower flange recess 75 may have shapes or constructions not limited to those discussed in the embodiment but modified appropriately.

INDUSTRIAL APPLICABILITY

The present invention is preferably applicable to an automobile having a vehicle body whose side structure including a rail assembly located laterally outwardly thereof, an arch assembly disposed on the rail assembly, and a roof panel supported by the arch assembly.

REFERENCE SIGNS LIST

10 . . . a side structure of a vehicle body, 15 . . . a rail assembly, 16 . . . a side panel, 18 . . . an arch assembly, 20 . . . a roof panel, 21 . . . a panel body, 22 . . . a front roof flange (roof flange), 24 . . . a roof recess, 32 . . . an outer portion, 33 . . . an outer extension portion, 33a . . . a lateral inner end of the outer extension portion, 36 . . . an inner portion, 37 . . . an inner extension portion, 37a . . . a lateral inner end of the inner extension portion, 41 . . . a patch member, 42 . . . a reinforcing rail patch, 43 . . . a patch extension portion, 45 . . . an extension body of the outer extension portion, 46 . . . a front outer flange (outer flange), 46a . . . a lateral inner end of the front outer flange, 47 . . . an outer projection, 54 . . . an extension body of the inner extension portion, 55 . . . a front inner flange (inner flange), 56 . . . an inner projection, 62 . . . an upper member, 62a . . . a lateral outer end of the upper member (end of the arch assembly), 63 . . . an upper body, 64 . . . a front upper flange (upper flange), 65 . . . an upper projection, 72 . . . a lower member, 72a . . . a lateral outer end of the lower member (end of the arch assembly), 73 . . . a lower body, 74 . . . a front lower flange (lower flange), 75 . . . a lower flange recess, 91 . . . a first spot welding region, 92 . . . a roof side spot welding region, 93 . . . a second spot welding region, 94 . . . a third spot welding region, 95 . . . a fourth spot welding region

The invention claimed is:

1. A side structure of a vehicle body, comprising:
    a rail assembly extending in a front-and-rear direction of the vehicle body and defining an upper part of the side structure of the vehicle body;
    an arch assembly extending laterally of the vehicle body and having an end located on the rail assembly;
    a roof panel supported by the arch assembly;
    the rail assembly including:
        an outer portion extending in the front-and-rear direction of the vehicle body and located laterally outwardly of the vehicle body;
        an inner portion disposed closer to a lateral center of the vehicle body than the outer portion, the inner portion cooperating with the outer portion to define a closed cross-sectional structure extending in the front-and-rear direction of the vehicle body;
        an outer extension portion formed integrally with the outer portion and extending toward the lateral center of the vehicle body; and
        an inner extension portion formed integrally with the inner portion and extending toward the lateral center of the vehicle body, the inner extension portion having a lateral inner end located closer to the lateral center of vehicle body than a lateral inner end of the outer extension portion, the inner extension portion cooperating with the outer extension portion to define a closed cross-sectional structure;
    the arch assembly including:
        an upper member having a lateral outer end carried on the outer extension portion; and
        a lower member disposed below the upper member and having a lateral outer end carried on the inner extension portion, the lower member cooperating with the upper member to define a closed cross-sectional structure extending laterally of the vehicle body,
    wherein the roof panel includes a panel body and a roof flange protruding forwardly of the vehicle body from the panel body,
    wherein the upper member includes an upper body and an upper flange protruding from the upper body of the upper member in overlapping relationship to the roof flange, the upper flange including an upper projection protruding forwardly of the vehicle body more than the roof flange,
    wherein the lower member includes a lower body and a lower flange protruding from the lower body of the lower member in overlapping relationship to the upper flange,
    wherein the outer extension portion of the rail assembly includes an extension body and an outer flange protruding from the extension body of the outer extension portion in overlapping relationship to the upper flange, the outer flange having a lateral inner end including an outer projection,
    wherein the inner extension portion of the rail assembly includes an extension body and an inner flange protruding from the extension body of the inner extension portion in overlapping relationship to the lower flange, the inner flange having an inner projection overlapping the outer projection, and
    wherein the upper flange, the outer flange and the inner flange define a first spot welding region in which the upper projection, the outer projection and the inner projection are spot welded to one another.

2. The structure of claim 1, wherein the roof flange has a portion corresponding to the outer projection, the upper projection and the inner projection, the portion of the roof flange having a roof recess contoured to avoid the outer projection, the upper projection and the inner projection.

3. The structure of claim 1, wherein a roof side spot welding region in which the roof flange, the upper flange, and the lower flange are spot welded to one another is located closer to the lateral center of the vehicle body than the first spot welding region,
    wherein the lower flange has a lower flange recess located closer to the lateral center of the vehicle body than the roof side spot welding region,
    wherein the inner flange of the inner extension portion includes a lateral inner end terminating in the lower flange recess, and
    wherein a second spot welding region in which the roof flange, the upper flange and the inner flange are spot welded to one another is located in the lower flange recess.

4. The structure of claim 3, wherein a third spot welding region in which the roof flange, the upper flange and the inner flange are spot welded to one another is located laterally outwardly of the lower member and located closer to the lateral center of the vehicle body than the outer extension portion, and wherein a fourth spot welding region in which the roof flange, the outer flange, and the inner flange are spot welded to one another is located laterally outwardly of the upper member.

5. The structure of claim 1, wherein the rail assembly further includes:
 a reinforcing rail patch disposed between the outer portion and the inner portion; and
 a patch extension portion formed integrally with the reinforcing rail patch and extending within the closed cross-sectional structure defined by the outer extension portion and the inner extension portion.

6. The structure of claim 2, wherein a roof side spot welding region in which the roof flange, the upper flange, and the lower flange are spot welded to one another is located closer to the lateral center of the vehicle body than the first spot welding region,
 wherein the lower flange has a lower flange recess located closer to the lateral center of the vehicle body than the roof side spot welding region,
 wherein the inner flange of the inner extension portion includes a lateral inner end terminating in the lower flange recess, and
 wherein a second spot welding region in which the roof flange, the upper flange and the inner flange are spot welded to one another is located in the lower flange recess.

7. The structure of claim 6, wherein a third spot welding region in which the roof flange, the upper flange and the inner flange are spot welded to one another is located laterally outwardly of the lower member and located closer to the lateral center of the vehicle body than the outer extension portion, and
 wherein a fourth spot welding region in which the roof flange, the outer flange, and the inner flange are spot welded to one another is located laterally outwardly of the upper member.

8. The structure of claim 1, wherein the rail assembly further includes:
 a reinforcing rail patch disposed between the outer portion and the inner portion; and
 a patch extension portion formed integrally with the reinforcing rail patch and extending within the closed cross-sectional structure defined by the outer extension portion and the inner extension portion.

9. The structure of claim 2, wherein the rail assembly further includes:
 a reinforcing rail patch disposed between the outer portion and the inner portion; and
 a patch extension portion formed integrally with the reinforcing rail patch and extending within the closed cross-sectional structure defined by the outer extension portion and the inner extension portion.

10. The structure of claim 3, wherein the rail assembly further includes:
 a reinforcing rail patch disposed between the outer portion and the inner portion; and
 a patch extension portion formed integrally with the reinforcing rail patch and extending within the closed cross-sectional structure defined by the outer extension portion and the inner extension portion.

11. The structure of claim 4, wherein the rail assembly further includes:
 a reinforcing rail patch disposed between the outer portion and the inner portion; and
 a patch extension portion formed integrally with the reinforcing rail patch and extending within the closed cross-sectional structure defined by the outer extension portion and the inner extension portion.

12. The structure of claim 6, wherein the rail assembly further includes:
 a reinforcing rail patch disposed between the outer portion and the inner portion; and
 a patch extension portion formed integrally with the reinforcing rail patch and extending within the closed cross-sectional structure defined by the outer extension portion and the inner extension portion.

13. The structure of claim 7, wherein the rail assembly further includes:
 a reinforcing rail patch disposed between the outer portion and the inner portion; and
 a patch extension portion formed integrally with the reinforcing rail patch and extending within the closed cross-sectional structure defined by the outer extension portion and the inner extension portion.

\* \* \* \* \*